(12) United States Patent
Ramsay et al.

(10) Patent No.: US 12,158,420 B2
(45) Date of Patent: Dec. 3, 2024

(54) DISPLACEABLE RECEPTACLE FOR TEST SAMPLE

(71) Applicant: Specac Limited, Orpington (GB)

(72) Inventors: Michael Ramsay, Caterham (GB); George Harman, Coventry (GB); Ian Gaskin, Tunbridge Wells (GB)

(73) Assignee: Specac Limited, Orpington (GB)

( * ) Notice: Subject to any disclaimer, the term of this patent is extended or adjusted under 35 U.S.C. 154(b) by 311 days.

(21) Appl. No.: 17/841,003

(22) Filed: Jun. 15, 2022

(65) Prior Publication Data

US 2022/0326154 A1 Oct. 13, 2022

Related U.S. Application Data

(63) Continuation of application No. PCT/EP2020/085387, filed on Dec. 9, 2020.

(30) Foreign Application Priority Data

Dec. 19, 2019 (GB) ..................................... 1918807

(51) Int. Cl.
*G01N 21/552* (2014.01)
*G01N 1/10* (2006.01)
(Continued)

(52) U.S. Cl.
CPC ............. *G01N 21/552* (2013.01); *G01N 1/14* (2013.01); *G01N 2001/1031* (2013.01); *G01N 2021/036* (2013.01)

(58) Field of Classification Search
CPC .. G01N 21/552; G01N 21/03; G01N 21/0303; G01N 1/14; G01N 2001/1031; G01N 2021/036; G01N 2021/0321; G01N 2021/0389; G01N 2021/0106; G01N 2021/0307; G01N 2201/0227; G01N 2201/0228; B01L 2200/0689; B01L 3/5055

See application file for complete search history.

(56) References Cited

U.S. PATENT DOCUMENTS

2007/0229094 A1 10/2007 Kasai et al.
2008/0088837 A1 4/2008 Gardner, Jr.
(Continued)

FOREIGN PATENT DOCUMENTS

CN 202305391 U 7/2012
DE 202017006067 U1 1/2018
(Continued)

*Primary Examiner* — Tarifur R Chowdhury
*Assistant Examiner* — Carlos Perez-Guzman
(74) *Attorney, Agent, or Firm* — Reinhart Boerner Van Deuren P.C.

(57) ABSTRACT

A system for containing a sample for analysis by a spectrometer, comprising a sample receptacle unit with a well for containment of the sample, the well comprising a well inner wall and well floor, a floor aperture in the well floor, and comprising a first spectroscopy element, the first spectroscopy element spanning the opening of floor aperture, wherein the well further comprises a sealing material at the interface of the inner wall with the first spectroscopy element, wherein radiation is free to pass through the floor aperture to the first spectroscopy element.

20 Claims, 11 Drawing Sheets

(51) Int. Cl.
*G01N 1/14* (2006.01)
*G01N 21/03* (2006.01)

(56) References Cited

U.S. PATENT DOCUMENTS

2017/0274375 A1* 9/2017 Kakuda ............... B01L 3/50825
2021/0339245 A1* 11/2021 Baker ................ B01L 3/50825

FOREIGN PATENT DOCUMENTS

| EP | 0147124 A2 | 7/1985 | |
| EP | 1102057 A1 * | 5/2001 | .............. B01L 3/508 |
| EP | 1630541 A1 | 3/2006 | |
| GB | 429242 A | 5/1935 | |
| GB | 2545157 A | 6/2017 | |
| WO | WO 2015/174162 A1 | 11/2015 | |

* cited by examiner

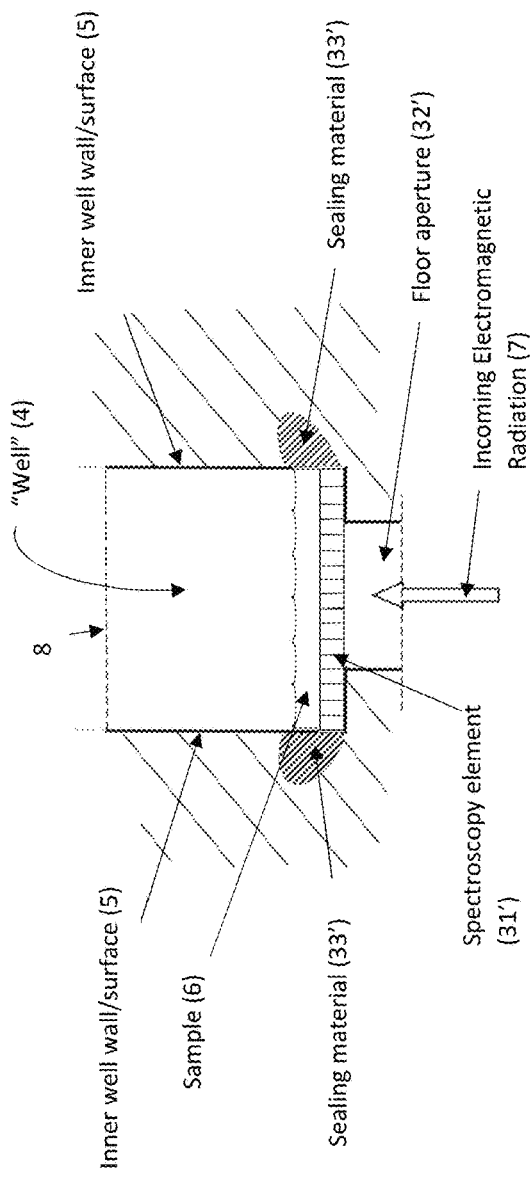
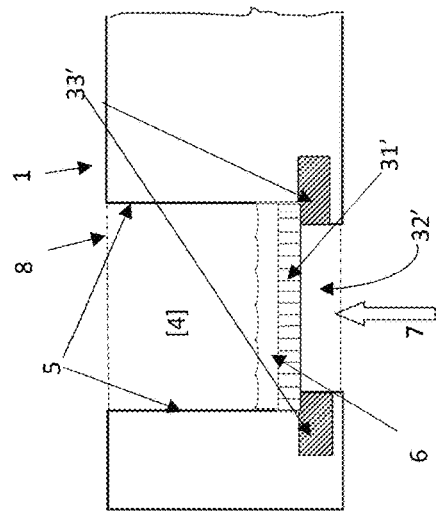
Figure 2D
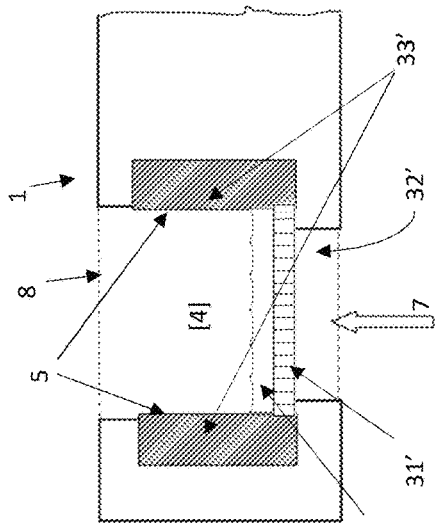
Figure 2C
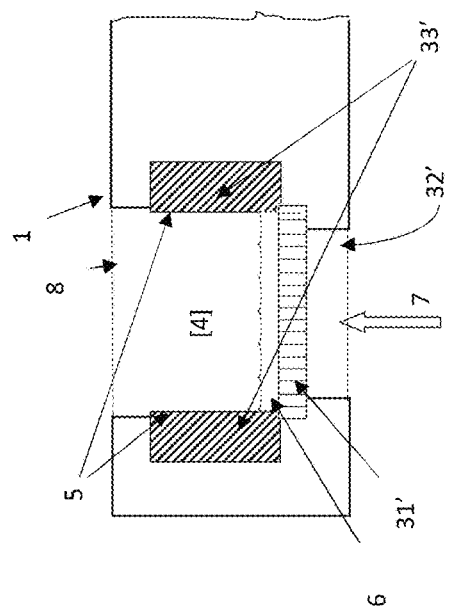
Figure 2B
Figure 2A

DISPLACEABLE RECEPTACLE FOR TEST SAMPLE

CROSS-REFERENCE TO RELATED PATENT APPLICATIONS

This patent application is a continuation of co-pending international patent application No. PCT/EP2020/085387, filed Dec. 9, 2020, which designated the United States, the entire teachings and disclosure of which are incorporated herein by reference thereto. This patent application claims the benefit of GB Patent Application No. 1918807.7, filed Dec. 19, 2019, the entire teachings and disclosure of which are incorporated herein by reference thereto.

TECHNICAL FIELD

The present disclosure relates to an improved sample holder or receptacle in, or for use in conjunction, with an apparatus for analysing or identifying the chemical or physical composition of said sample, as well as associated processes, notably processes of manufacture of such a holder.

The disclosure relates primarily to a removable receptacle arrangement for holding, receiving or containing a sample of material to be analysed or identified, the receptacle being configured for use in or with a spectrometer or other analysing/identifying apparatus, the analysis or identification being an optical technique.

BACKGROUND OF THE INVENTION

The need to determine the composition of an unidentified material arises in many situations, including industrial, environmental, scientific, medical and legal applications. Various techniques may be applied to analyse samples of unidentified materials and determine their chemical or physical composition.

The field of spectroscopy considers the interaction of matter with an irradiating energy. Spectrometry comprises a family of applications which measure the modification of a known energy spectrum by a material sample and identify the spectral "signatures" of elements, molecules or functional groups comprised in the sample. The modification of the energy spectrum may occur through reflection, transmission or emission, and the spectra applied may be electromagnetic waves or high energy particles, and may be visible or invisible to the human eye. This disclosure relates to all spectrometers and spectrometric techniques, including ATR spectrometry, reflectance spectrometry, as well as transmission spectrometric techniques.

Like most optical instruments, spectrometers are designed to minimise vibration and displacement of the sample, which would interfere with the analysis: in order to provide the necessary mechanical stability, spectrometers generally include a heavy frame, so that the sample is in a constant and stable "platform" in a predetermined location. The spectrometer generally comprises a platform for receiving the sample, an energy source and a receiver for receiving the modified spectrum, as well as a transport system for directing, focusing and manipulating the incident and modified spectral beams, frequently including reflector or mirror units. Amid the various attendant components of the spectrometer, the platform may be of limited accessibility.

As well as stability and accessibility, the spectrometer may also have to accommodate a large turnover of samples each requiring analysis. In many situations a large number of different samples may require spectral analysis, possibly in a limited time period. In medical and forensic fields, numerous samples, perhaps from different patients or different investigations, may have to be analysed in quick succession. In such situations samples may have to be replaced or exchanged rapidly, to and from the predetermined location within the spectrometer.

The reader will appreciate that there is a need for an arrangement, for use with or in spectrometers or other spectral analysis apparatus or optical analysis apparatus, which facilitates a rapid turnover of samples to be analysed, but which nevertheless ensures that the sample is accurately positioned at the predetermined location in the radiation path of the apparatus. DE202017006067 discloses a sample carrier holder for interchangeable individual ATR elements, with an upper plate for accommodating the sample and a lower plate.

The arrangement must equally be able to receive samples for testing which may be in liquid form: in such cases, the operator, measuring out a quantity of liquid, and relying on the surface tension of the liquid, needs to position the sample on the spectrometer platform in the predetermined location in the spectrometer. This presents a particular challenge, with use of a pipette in a restricted space, to deliver the correct quantity of liquid without spillage is difficult and unreliable. Moreover, spectrometers are sensitive machines, susceptible to misplaced liquids and vapours, which can damage the machine, or even interfere with the spectral analysis, thereby leading to incorrect results. If the sample material is corrosive, the damage to the machine may be exacerbated and/or be permanent.

Conventional systems, in ATR and other spectrometers, are sometimes sold with a detachable (but inconvenient) containment vessel, serving as an accessory of the spectrometer, to contain a sample. The containment vessel once loaded with the relevant sample may be mounted into the spectrometer and secured by screw means in place. The containment vessel has to be as carefully designed and engineered as the spectrometer and is therefore difficult and expensive to produce. Such vessels are bulky and cumbersome and use of such a containment vessel is unwieldy, requiring considerable manual intervention, first to load the sample into the vessel and then to mount the vessel into the spectrometer. Misalignments of the vessel mean the vessel has to be re-mounted. A containment vessel is not suited to a large turnover of samples or to a rapid turnaround time between one test and the next.

TECHNICAL OBJECTIVE

This disclosure relates to a novel and inventive apparatus and method which overcomes the shortcomings outlined above. An objective of the arrangement and method in this disclosure is to provide a receptacle arrangement for a test sample which is easy to load and to securely mount in a sample analysis instrument.

A further objective is the provision of receptacle arrangement and associated method which facilitates a rapid turnover of samples, including liquid samples, to be tested using spectroscopic analysis, including by ATR (Attenuated Total Reflection), and transmission spectral analysis. References to ATR and transmission spectroscopy, as well as references to ATR elements and transmission windows are explained in a later section herewith. A yet further objective is to provide a receptacle arrangement which is easy to manufacture.

An embodiment of an arrangement disclosed herein may comprise two interconnectable components: at least one sample receptacle configured to receive and contain a sample to be analysed, and a receiving unit which forms a part of the spectrometer and which is configured to receive the sample receptacle unit. This receptacle arrangement allows samples to be easily loaded into the sample receptacle, including by automated means, and, thereafter, permits the simple insertion of the previously loaded sample receptacle into the receiving unit of the spectrometer. The receiving unit may be rigidly fixed, permanently or temporarily, in the spectrometer, by suitable fixing means, so that there is no relative movement between the receiving unit and the rest of the spectrometer. The receiving unit may form an integral part of the spectrometer in which it is comprised. The sample receptacle and the receiving unit are configured, by virtue of their respective shapes or the shapes of parts of each unit, to interconnect with each other, by, for example, sliding, rotating or inserting the sample receptacle unit into the receiving unit. Once the sample receptacle unit is slid, rotated or inserted into the receiving unit then the sample receptacle unit is securely (but temporarily) fixed in that position and ensuring that it too is not subject to any relative movement with the rest of the spectrometer.

Both the sample receptacle unit and receiving unit are simple in construction and may be manufactured, for example, by simple and reproducible moulding techniques. The sample receptacle unit may be of a simple cheap construction, without detracting from the capacity of the sample receptacle unit to interconnect with the receiving unit.

It is envisaged in accordance with the apparatus and method disclosed herein, that a plurality of identical sample receptacle units can be provided and, where desirable, used simultaneously or in rapid succession, potentially with the same receiving unit of the spectrometer. The sample may be loaded into a sample receptacle unit outside the spectrometer, and loaded receptacle unit then inserted into the recess of the receiving unit of the spectrometer, ensuring the sample is correctly positioned for correct alignment during spectral analysis. Repeatable alignment of samples is thus ensured.

The loading of a sample into one sample receptacle unit is independent of the loading of another sample, perhaps of a different material, into another sample receptacle unit, with little loss of time, or even at the same time. The loaded sample receptacle units can be loaded (slid, inserted, rotated etc) and unloaded, and the respective samples, analysed in quick succession, in a single receiving unit in a single spectrometer. The system envisages single use disposable receptacle units, which may easily loaded and positioned for analysis before being discarded. The simple structure provided by a simple over-moulding manufacture process ensures large volume production at minimal cost to facilitate the disposable aspect of the sample receptacle unit. Such an approach is particularly suited to toxic or corrosive materials to be tested.

These and other technical objectives, as set out below, are achieved by the invention disclosed herein.

BRIEF DESCRIPTION OF THE FIGURES

Reference is now made to certain embodiments of the apparatus and method disclosed, by way of example, herein, one or more of which are illustrated in the accompanying drawings.

FIGS. 2A to 2F are cross-sectional views of sample receptacle units in accordance with various aspects of the invention

Figure 1A:
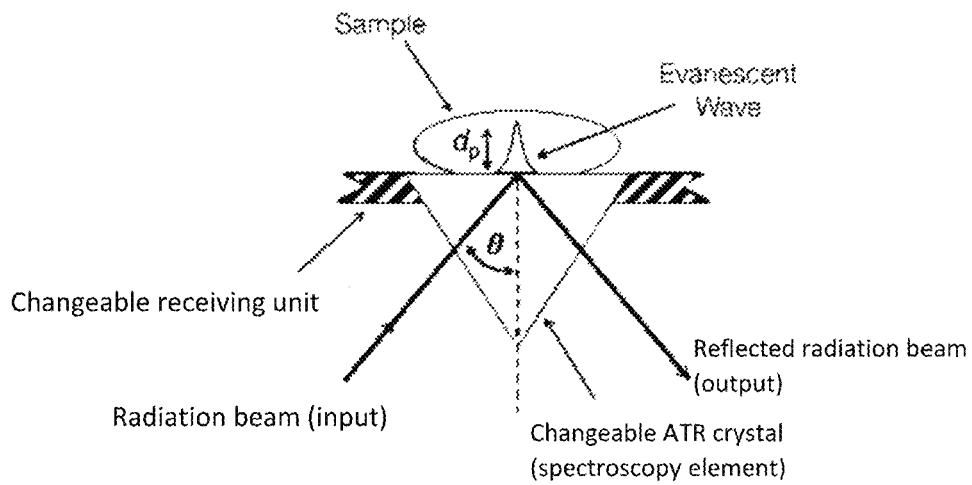
FIG. 1A is a schematic diagram of reflectance/ATR spectral analysis

The description makes use of certain alphanumerical references, as appropriate, to refer to features in the drawings. The same or similar references in the drawings and description have been used to indicate the same or similar parts of the arrangement disclosed herein. In some instances, the same or similar parts of the arrangement in different drawings and the description are cross-referenced by means of reference signs in square brackets in the drawings.

DETAILED DESCRIPTION OF THE FIGURES AND EMBODIMENTS

Reference will be made in detail in this description to examples and embodiments of the apparatus and method disclosed herein, one or more of which are illustrated in the drawings. The embodiments and examples are described for the purpose of explanation and are not intended to limit the scope of the Claims in any way. It will be apparent to the reader that variations may be made to the embodiments described herein that fall within the scope of the invention which is defined in the Claims. Features illustrated or described as present in any particular embodiment as described herein, may also be used with another embodiment, thereby providing further embodiments. The present disclosure covers any variations, amendments and modifications which fall within the scope of the accompanying Claims and their equivalents.

Various embodiments, aspects and implementations of the present invention, as well as technical objectives and advantages will be apparent to those skilled in the art, upon consideration of the description herein, in combination with the drawings. Unless indicated otherwise by the context, the terms "first", "second", "third", "last", etc are adopted to distinguish one component from another, and are not intended to define or limit the position, location, alignment or importance of the components specified. The singular forms "a", "an", and "the" include plural references, unless, based on the context, this is clearly not the case.

An exemplary aspect of the present disclosure is directed to a system for containing a sample for analysis by a spectrometer, may comprise a sample receptacle unit with a well for containment of the sample. The well may comprise a well inner wall and well floor, a floor aperture in the well floor, and may comprise a first spectroscopy element, the first spectroscopy element spanning the opening of floor aperture, wherein the well may further comprise a sealing material bonded to the sample receptacle unit at the interface of the inner wall with the first spectroscopy element, wherein radiation may be free to pass through the floor aperture to the first spectroscopy element. In a further exemplary aspect of the present disclosure the well, the floor aperture and the first spectroscopy element may be configured to align with each other and the floor aperture is configured to pass radiation from a radiation source to the first spectroscopy element. In another exemplary aspect the sample receptacle unit may be formed by injection moulding and the sealing material is bonded to the sample receptacle unit by a bonding process. The sealing material and the sample receptacle unit may together form a single integral component. The sealing material may be bonded by overmoulding.

In another exemplary aspect of the present disclosure directed to a system for containing a sample for analysis by a spectrometer, a sample receptacle unit may further comprise a cover comprising a cover aperture with inner walls a portion of which comprises the sealing material a main body, with a bay comprising a bay floor with a floor aperture in the bay floor and a first spectroscopy element spanning the floor aperture, wherein the cover may be displaceable between an open position and a closed position, and the bay of the main body may be configured to receive, in the closed position, the displaceable cover. The cover aperture inner walls and the first spectroscopy element, may be configured to constitute, in the closed position, the well for containment of the sample. The sealing material may be configured to form a seal at the interface of the cover aperture inner walls with the first spectroscopy element and retain the first spectroscopy element in place. The main body and the displaceable cover may be joined to each other by a reduced thickness section, and wherein the displaceable cover, the main body and the reduced thickness section form a single integral component. The reduced thickness section may be flexible and may be configured to form a hinge between the displaceable cover and the main body for pivotal movement of the displaceable cover relative to the main body. In the closed position, a closure means may be configured to retain the displaceable cover in the closed position on the floor of the main body and to force the sealing material into sealing contact with the first spectroscopy element. The closure means may comprise a clip arrangement, comprising one or more a clip-flange pair arrangements, wherein, for each clip-flange pair, either an inner side of the bay or an outer side of the displaceable cover comprise a clip, configured for releasable engagement with a flange comprised in the other of the inner side of the bay or the outer side of the displaceable cover.

In a yet further exemplary aspect of the system of the present disclosure directed to a system comprising a sample receptacle unit for containing a sample for analysis by a spectrometer, the sample receptacle unit may further comprise a cover comprising a cover aperture with inner walls and a main body, with a bay comprising bay inner sides, a bay floor with a floor aperture in the bay floor and a first spectroscopy element spanning the floor aperture, wherein the sealing material may be comprised in the portions of the bay walls interfacing with the first spectroscopy element wherein the cover may be displaceable between an open position and a closed position, and the bay of the main body may be configured to receive, in the closed position, the displaceable cover and the first spectroscopy element, constituting, in the closed position, the well for containment of the sample. The sealing material may be configured to form a seal at the interface of the bay sides with the first spectroscopy element wherein, in the closed position, the displaceable cover may apply a force on the first spectroscopy element and retain the first spectroscopy element in place on the sealing material. The system may further comprise a closure means, wherein, in the closed position, the closure means may be configured to retain the displaceable cover, in the closed position, on the spectroscopy element and to force the first spectroscopy element into sealing contact with the sealing material. The closure means may comprise a clip arrangement, comprising one or more a clip-flange pair arrangements, wherein, for each clip-flange pair, either an inner side of the bay or an outer side of the displaceable cover comprise a clip, configured for releasable or non-releasable engagement with a flange comprised in the other of the inner side of the bay or the outer side of the displaceable cover. The main body and the displaceable cover may be joined to each other by a reduced thickness section, and wherein the displaceable cover, the main body and the reduced thickness section may form a single integral component. The reduced thickness section may be flexible and may be configured to form a hinge between the displaceable cover and the main body for pivotal movement of the displaceable cover relative to the main body.

In another exemplary aspect of the present disclosure directed to a system for containing a sample for analysis by a spectrometer, comprising a sample receptacle unit, a main body of the sample receptacle unit may comprise a bay which is the well for containment of the sample, the bay having bay inner sides, a bay floor with a floor aperture, the bay floor comprising the first aperture and the first spectroscopy element spanning the first aperture, wherein the interface of the first spectroscopy element with the inner sides comprises the sealing material, the sealing material configured to retain the first spectroscopy element in place. The sealing material may be comprised in the portions of the bay inner sides interfacing with the first spectroscopy element. The sealing material may be comprised in portions of the bay floor interfacing with the first spectroscopy element. The sealing material may be comprised in portions of the bay inner sides and in portions of the bay floor interfacing with the first spectroscopy element.

An exemplary embodiment of the system of the present disclosure may further comprise a receiving unit removably fixed to a spectrometer, the receiving unit comprising a recess configured to receive the sample receptacle unit, wherein the sample receptacle unit is configured to mate with the recess of the receiving unit.

An exemplary embodiment of the system of the present disclosure may further comprise a receiving unit aperture for receiving radiation from a radiation source of the spectrometer, wherein, when the sample receptacle unit is mated with the recess, the floor aperture is aligned with the receiving unit aperture and the radiation source, and the spectroscopy element is aligned to receive the radiation from the radiation source. The sample receptacle unit may be configured to slide into the recess and be releasably secured in the recess. One of the sample receptacle unit and the recess may have elongate grooves, the other of the sample receptacle unit and the recess may have elongate flanges, the elongate grooves being configured to releasably accommodate the elongate flanges.

In an exemplary embodiment of the system of the present disclosure the first spectroscopy element may be a reflectance element for reflectance spectral analysis. The first spectroscopy element may be an ATR crystal element. The ATR crystal element may be composed of a material suitable for use as an ATR element in ATR spectral analysis, such as one of silicon or germanium or zinc selenide or diamond.

In another exemplary embodiment of the system of the present disclosure the first spectroscopy element may be a transmission window for transmission spectral analysis. The transmission window may be composed of a material suitable for use as a transmission window in transmission spectral analysis, such as one of calcium fluoride, sapphire, zinc selenide, potassium bromide, barium fluoride, sodium chloride or fused silica. The system may further comprise a frame comprising inner walls and forming an extended space for containment of the sample. It may also further comprise a second transmission window in a second main body, the first and second transmission windows, the first and second main bodies, and the frame together forming a transmission cell for transmission spectral analysis.

An exemplary aspect of the present disclosure is directed to a method of injection moulding for producing, in a first fabrication procedure, the displaceable cover as described previously herein. An exemplary aspect of the present disclosure is directed to a method of injection moulding for producing, in a second fabrication procedure, the main body of the sample receptacle unit as described previously herein. The displaceable cover and the main body may each constitute a single integral component.

A further exemplary aspect of the present disclosure is directed to a method of injection moulding for producing, in a third fabrication procedure, the sample receptacle unit as described above, the displaceable cover, together with the main body, being fabricated together as a single integral component, as described herein.

Another exemplary aspect of the present disclosure is directed to a method of injection moulding wherein any of the fabrication procedures may be a single fabrication procedure. The fabrication procedure may comprise injection moulding of a first material, such as polypropylene, acetylene butanol styrene (ABS) or other thermoplastic, or hard polymer, the single integral component being composed of the first material. The fabrication procedure may further comprise the over-moulding of a sealing material on to the first material. The sealing material may be relative to the first material and is a rubber, or rubber-like material, such as a thermoplastic elastomer, for example thermoplastic polyurethane (TPU). The reader will appreciate that the apparatus disclosed herein may be used in applications of reflection/reflectance (including ATR) and transmission spectroscopy. Unless otherwise stated, the exemplary embodiments described herein are equally applicable to reflection/reflectance spectroscopy (including ATR) and transmission spectroscopy, and references herein to a spectroscopy element, including spectroscopy element (31, 31g), referenced in later sections, unless otherwise stated, apply equally to a spectroscopy element, an ATR element and a transmission window, for use in a spectrometer or spectroscopic arrangement, as appropriate.

FIG. 1A provides a generic illustration of the rudimentary principles underlying the main reflectance spectrometric technique, Attenuated Total Reflectance/Reflection (ATR), as applied in certain aspects of the invention disclosed herein. Electromagnetic radiation (often infra-red or visible light) is made to pass through an appropriate spectroscopy element (an ATR element) at a predetermined angle above the critical angle and is directed through the ATR element to an opposite surface of the ATR element, this surface forming the interface with the sample to be tested. ATR spectroscopy are particularly suited to liquid samples, as liquids provide a good interface between the sample and the ATR element, and highly accurate identifications of the compositions of liquid samples, including samples dissolved in liquids, may be derived. Samples in solid form may also be tested, especially if good contact between the element and solid is achieved. Alternatively, solid samples may be ground into a powder and dissolved/suspended in a liquid medium which may be then loaded onto the element.

Under ATR radiation is internally reflected at the sample/element interface and may be subject to numerous further internal reflections within the ATR element. A portion of the beam leaves the element and passes through the sample as an evanescent wave. The internal reflection at the sample interface causes the spectrum of the incident radiation to be modified, the modification depending on the molecules present in the sample: it is the spectral composition of the reflected beam (or beams) which is/are analysed in order to determine the molecules or functional groups present in the sample.

Figure 1B:
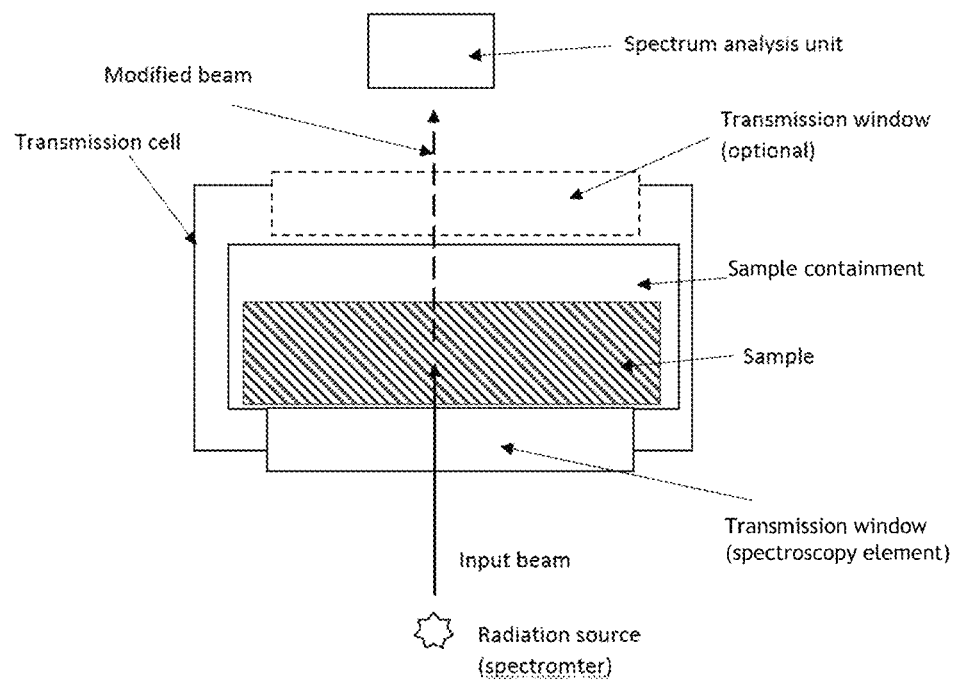
FIG. 1B is a schematic diagram of transmission spectral analysis.

FIG. 1B is a schematic illustration of the principles of transmission spectrometric analysis, as applied in certain aspects disclosed herein. In transmission spectroscopy the incoming radiation enters a spectroscopy element (a transmission window, instead of a reflectance element, as in ATR). The sample forms an interface with the transmission window, as illustrated in FIG. 1B. In contrast to ATR, in transmission spectroscopy the incoming radiation passes through the transmission window without significant reflection: the transmission window does not significantly modify the input beam (or the modifications may be taken into account in the analysis) and serves to contain the sample. The beam (or beams) pass(es) the sample interface and enters the sample, which absorbs parts of its spectrum, and is directed to a spectral analysis unit of the transmission spectrometer. The radiation absorbed by the sample is characteristic of the molecules or functional groups present in the sample, the spectrometer receives the output radiation and analyses the absorption spectrum for the liquid within the transmission cell to identify the molecules or functional groups.

Figure 2F:
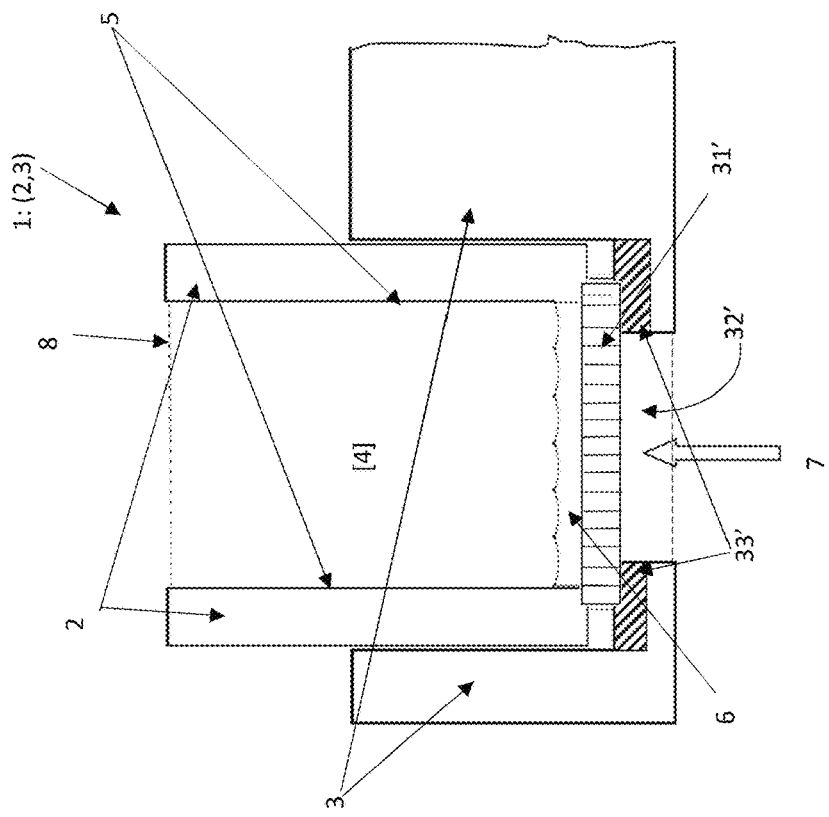

FIGS. 2A to 2F show schematic cross-sectional diagrams of exemplary conceptual embodiments of the invention disclosed herein, and are equally suitable for spectral analysis by reflectance and by transmission techniques. FIG. 2A shows, a basic well (4) for containment of a sample (6), the well (4) comprising well walls (5), well opening (8) and a well floor, the floor comprising a floor aperture (32'), and a spectroscopy element (31'), which spans the floor aperture (32'). In FIGS. 2A to 2F the sample (6) contained in the well (4) is shown as a liquid, but it may also be a solid. The spectroscopy element (31') may be a reflectance/ATR spectroscopy element, an ATR element or a transmission window, as explained herein. The spectroscopy element (31') is generally planar in shape and, being located on the floor of the well (4), serves as the bottom of the well (4) and the sample may be placed directly on the spectroscopy element (31'). In the perspective shown in these exemplary cross-sections the sample (6) may be located on the upper surface of the spectroscopy element (31') and input radiation (7) from a radiation source (in the spectrometer) is free to pass through the floor aperture (32') to the lower surface of the spectroscopy element (31'). Depending on whether the spectroscopic element is a reflectance/ATR element or a transmission window, the radiation (7) is reflected or transmitted by the element (31'), as explained previously in relation to FIGS. A and 1B. A sealing material (31') is located at the interface of the well bottom, i.e., with the spectroscopic element (31'), with the well walls (5), as shown generally in FIG. 2A. The sealing material (33') is a rubber or rubber-like material (discussed later) which serves to retain the spectroscopy element (31') in place and to provide a seal for the sample (6). The incoming radiation is shown in FIGS. 2A to 2F as entering the floor aperture (32') perpendicularly, but the angle of incidence of the incoming radiation may be any suitable angle, as discussed previously herein, and is not limited to the angles in these diagrams.

FIG. 2A shows this concept in its most basic form, the well (4) being formed in an unspecified entity. FIGS. 2B to 2F show further schematic cross-sectional views of various exemplary embodiments in accordance with the invention in which the well (4) is part of a sample receptacle unit (1) which is a convenient-to-use mobile unit for containment of a sample (6) according to the disclosure herein: once loaded via the well opening (8) into the well (4) in the sample receptacle unit (1), the sample may be easily moved and relocated by means of the mobile sample receptacle unit (1). The sample (in the receptacle unit (1)) may be loaded into the spectrometer, as explained in a later passage herein.

FIGS. 2B to 2D show exemplary embodiments of the mobile sample receptacle unit (1) in accordance with the invention, in which the well (4) is formed directly as a bay or recess in the sample receptacle unit (1), the bay having a floor with a floor aperture (32'). The well walls (5) comprise the sealing material (8). In FIG. 2B the sealing material (33') is located in the well walls (5) above the spectroscopy element (31') at the interface of the well walls (5) with the spectroscopy element (31'). The sealing material (33') exerts a generally downward retaining force (in the perspective of the diagram) on the outer portions of the spectroscopic element (31') with which it is in contact. In FIG. 2C the sealing material (33') extends beyond and below the outer perimeter of the spectroscopy element (31'), such that it interfaces with the spectroscopy element (31') above and below its outer perimeter, providing a retaining force which is generally radially inward in the perspective of the diagram. In FIG. 2D the sealing material (33') is located in the bay floor of the sample receptacle unit (1) at locations below the spectroscopy element (31') and provides a generally upward retaining force on the outer (peripheral) portions of the spectroscopic element (31') with which it is in contact. The reader will appreciate that in all embodiments shown, the force provided by the sealing material (33') is appropriate to the retention of the spectroscopy element (31') without causing damage to the spectroscopy element (31') which may be fragile and appropriate to provide a seal around the sample (6), which may be a liquid.

Figure 2E:
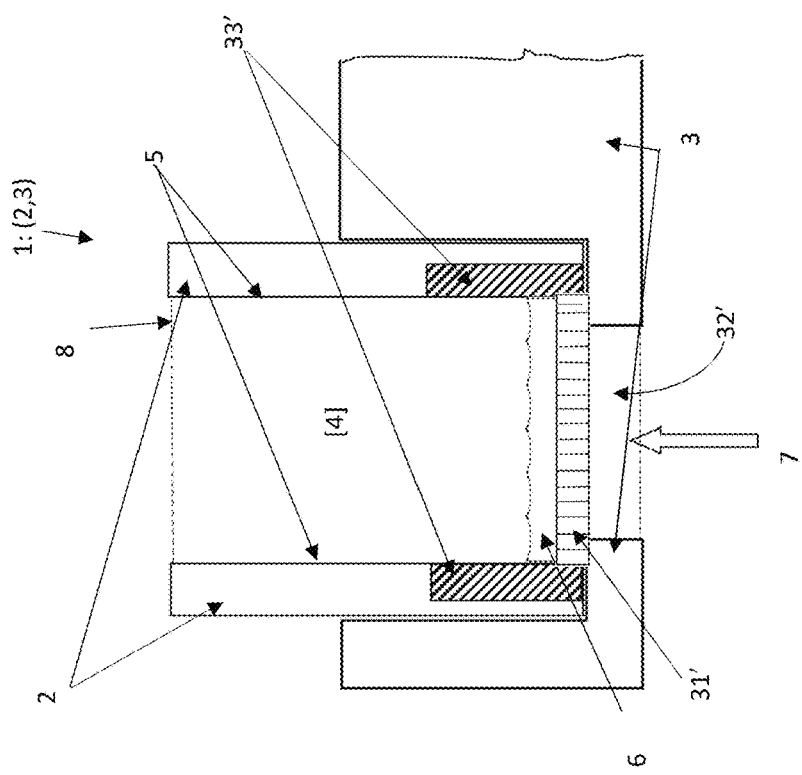

FIGS. 2E and 2F illustrate cross-sectional views of further exemplary embodiments in accordance with the invention, in which, by contrast to the embodiments of FIGS. 2B to 2D, the sample receptacle unit (1) comprises a main body (3) and a displaceable cover (2). In FIGS. 2E and 2F the displaceable cover (2) is shown in a closed position, i.e., inserted into a bay or recess in the main body (3), such that a cover aperture in the displaceable cover (2) in combination with the spectroscopy element (31') forms the well (4) and the inner walls (34') of the cover aperture form the well walls (5). The sealing material (33') is comprised in the well walls (5), as in previous embodiments, but, as seen in FIG. 2E, as the well walls (5) are constituted by the inner walls of the cover aperture, the sealing material (33') is comprised in the walls of the cover aperture. As in FIGS. 2B and 2C, the sealing material (33') in FIG. 2E provides a generally downward and/or radially inward retaining force on the spectroscopy element (31') and forms a seal around the sample (6) for containment thereof. The benefits of this arrangement will be described in detail in a later section herein.

The schematic diagram at FIG. 2F shows a further exemplary variation in accordance with the invention. Again, the displaceable cover (2) is shown in a closed position, i.e., inserted into a bay in the main body (3), such that an aperture in the displaceable cover (2) forms the well (4) and the inner walls of the cover aperture form the well walls (5). However, in this variation the sealing material (33') is located in the floor of the bay of the main body (1) below the spectroscopy element (31'), such that the displaceable cover (2) transmits a downward retaining force on the outer portions of the spectroscopy element (31') which forces the spectroscopy element (31') into sealing contact with the sealing material (8).

The reader will understand that the sealing material described herein is rubber or rubber-like in composition: due to its relative softness, this material will displace or "give" or deform slightly under an external pressure or force, thereby providing a seal around the component, such as the spectroscopy element (31'), with which it interfaces. The seal allows a sample, including a liquid sample (6), to be sealed at the bottom of the well (4) formed by the spectroscopy element (31'). The reader will also understand that the dimensions of the well (4), well wall (5), cover (2), floor aperture (32'), sealing material (33') and spectroscopy element (32') are configured to provide the described retaining force and seal, in accordance with the invention. It will also be understood that the sealing material (33') extends in at least a portion of the wall (5) or well floor to provide the same: while cross-sectional figures herein may illustrate the sealing material only in cross-section it will be understand that the sealing material extends continuously around the interface of the well wall (5) and/or well floor with the spectroscopy element (31'), thereby providing the seal.

Figure 3A:
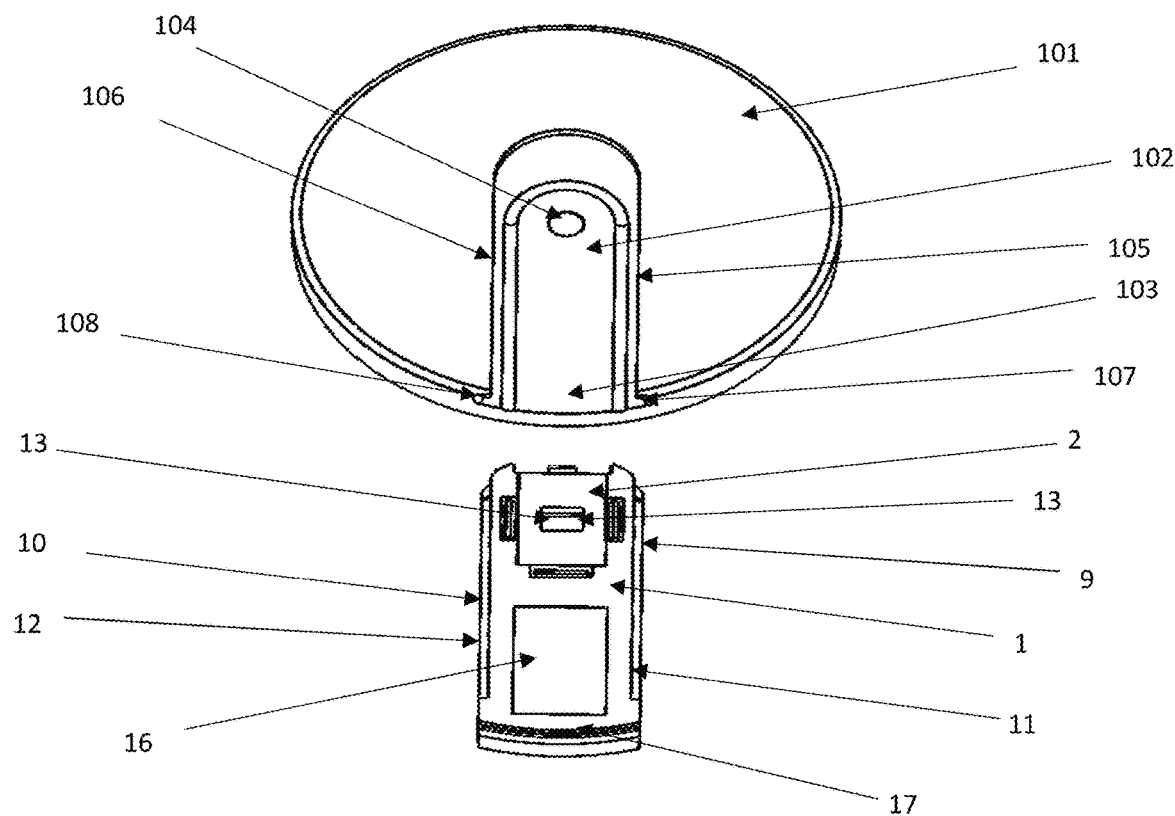
FIGS. 3A and 3B are illustrations of a sample receptacle unit and receiving unit in accordance with aspects of the invention.
Figure 3B:
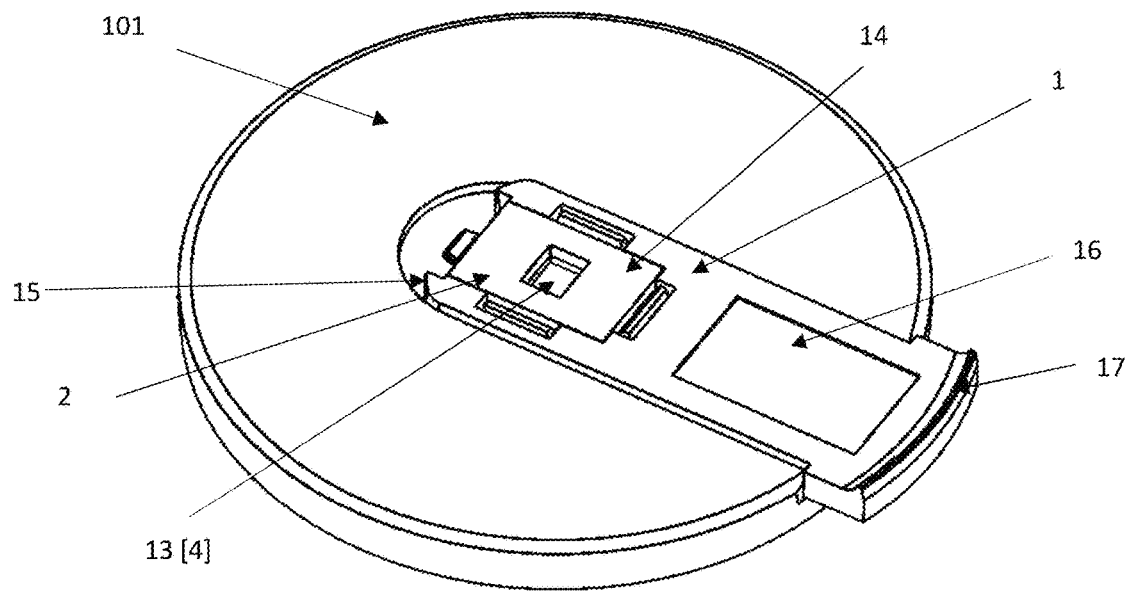

Before discussing the sample receptacle unit (1) in detail, its cooperation with the relevant components of the spectrometer will be explained. FIGS. 3A and 3B show how a sample receptacle unit according to an aspect of the invention is configured to mechanically cooperate with the relevant components.

FIG. 3A and 3B shows an arrangement according to an exemplary aspect of the apparatus of the disclosure herein, the arrangement comprising a sample receptacle unit (1) and a receiving unit (101), the sample receptacle unit (1) being adjacent the receiving unit (101). In FIGS. 3A and 3B the receiving unit is illustrated as circular in form, but any shape may be envisaged, as appropriate. Receiving unit (101) has a recess (102), open at one end (103), which is shaped and dimensioned for receiving the sample receptacle unit (1), and a receiving unit aperture (104) in the recess. The sample receptacle unit (1) may have a rounded end (15) to aid insertion into the recess (103). The side surfaces (105, 106) of the recess (103) each comprise an elongate groove (107, 108) which is dimensioned and shaped for receiving corresponding flanges (9, 10) which extend longitudinally along the side surfaces (11,12) of the sample receptacle unit (1). As the reader will appreciate, in the exemplary embodiment shown in FIG. 3A, the grooves (107,108) of the recess (102) of the receiving unit are shaped and dimensioned to receive in a close fit the elongate flanges (9,10) of the sample receptacle unit (1), such that the elongate grooves and elongate flanges in combination constitute a slide arrangement. In this way the sample receptacle unit (1) is configured to mate with the receiving unit (101). The sample receptacle unit (1) may be readily inserted into or removed from the receiving unit (101) by simple manual application by an operator.

In another embodiment (not shown in the figures) the elongate grooves (9, 10) are present on the side surfaces (11,12) of the sample receptacle unit (1), instead of on the side surfaces (105, 106) of the recess (103), and the elongate flanges (9,10) are present on the side surfaces (105,106) of the recess (103), ie the elongate flanges (9,10) and the elongate grooves (107,108) are exchanged when compared to the previous example. This arrangement represents an alternative slide arrangement to the one discussed above but, as the reader will understand, both sliding arrangements function in a broadly similar way.

In an embodiment of the apparatus of this disclosure, the recess end (103) may be closed (not shown in the figures) and the sample receptacle unit (1) may cooperate with the receiving unit (101) by means other than the sliding arrangement describe above embodiment. The sample receptacle unit (1) may simply be reversibly insertable or rotatable into the recess (103) of the receiving unit (1) for spectral analysis of any sample contained in the receptacle unit (1). The dimensioning and alignment aspects are, in this embodiment, unaltered with respect to other embodiments.

In FIGS. 3A and 3B both the recess (102) and the sample receptacle unit (1) are elongate in shape, but other rectangular shapes may also be envisaged in accordance with the apparatus of the disclosure herein, while the form and dimensional relationship between the respective grooves and flanges is the same as previously described, and constitutes a slide arrangement or other interconnecting arrangement, as previously described.

The sample receptacle unit (1) may comprise a displaceable cover (2), which may be closed, as shown in FIGS. 3A and 3B. The cover (2) comprises an open cover aperture (13) which allows light or electromagnetic radiation, as appropriate, to pass. The side walls of the cover aperture (13) extend into the removable cover (2) and substantially perpendicular to the plane of the upper surface (14) of the displaceable cover (2). When the displaceable cover (2) is in a closed position, the cover aperture (13) effectively forms a well (4), as described earlier. Not visible in FIGS. 3A and 3B, but discussed in detail below, the base of the well (4) formed by the cover aperture (13) comprises a reflectance/ATR element or transmission window, as appropriate.

The sample receptacle unit (1) may also comprise a writable label space (16) for use by the operator in labelling and documenting the sample tested or to be tested. A lip (17) may be provided at the distal end of the sample receptacle unit (1) to provide a greater manual grip of the sample receptacle unit (1) by the operator during insertion or removal of the sample receptacle unit (1). The upper surface of the sample receptacle unit (1) may also comprise a number of raised ridges (not shown in the drawing) which serve the same purpose.

FIG. 3B shows the same components as FIG. 3A. This figure shows the sample receptacle unit (1) after it has been laterally displaced into the recess (102) of the receiving unit (101), the elongate flanges having been inserted into the elongate grooves, the elongate grooves then accommodating the elongate flanges. The sample receptacle unit (1) has been mated with the receiving unit (101). The sliding arrangement constituted by the elongate flanges and elongate grooves then securely, but releasably, holds the sample receptacle unit in place.

In FIGS. 3A and 3B the sample receptacle unit (1), the receiving unit (101) and the recess (102) are illustrated with circular or partially circular or partially arcuate geometries, and cooperating arcuate surfaces also partially circular or arcuate, eg at curved side surface (15), but the disclosure herein is not limited to such forms: linear surfaces are also envisaged within the embodiments of the apparatus disclosed herein.

The reader will appreciate that, in order to facilitate both insertion/removal of the sample receptacle unit (1) in the recess (102), but to provide a secure grip on the sample receptacle unit (1), there is a minimal clearance between the elongate groove and the corresponding elongate flange, and the relative dimensions of the cross-sections of the mating parts are chosen accordingly. The close, but releasable, fit between the mating parts is also facilitated by suitable choice of the material of which the side surfaces of the sample receptacle unit (1) are made. In practice, this may be a plastic or polymer, such as polypropylene, or similar material, of suitable resilience to provide a close fit but sufficient "give" between respective grooves and flanges. As explained later in this disclosure, the entire receptacle unit (1), which may also include a spectroscopy element (an ATR element, or a transmission window, as appropriate), may be made as a single component in a single manufacturing process.

In FIG. 3B, the sample receptacle unit (1) is in mated position, the sample receptacle unit (1) being fully inserted into the receiving unit (101). In the mated position, accomplished by the sliding arrangement (as in FIG. 3B) or otherwise, the receiving unit aperture (104) of the receiving unit (101), the reflectance/ATR element or transmission window, as appropriate, the sample (when loaded in the well (4) formed by aperture (13)) and the cover aperture (13) are all aligned, such that radiation may pass the receiving unit aperture (104), the sample and the cover aperture (13), and vice-versa.

Figure 4A:
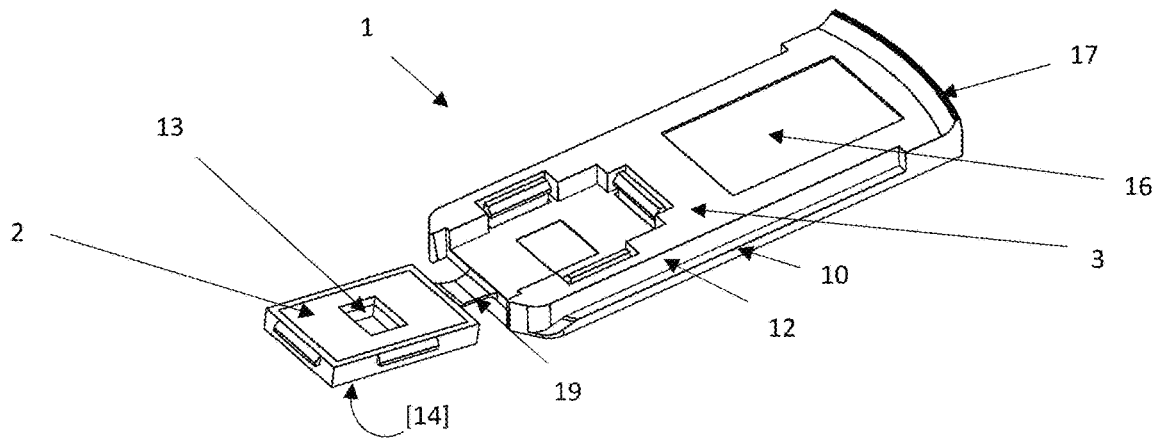
FIGS. 4A, 4B and 4C are illustrations of a sample receptacle unit in open and closed positions in accordance with aspects of the invention.
Figure 4B:
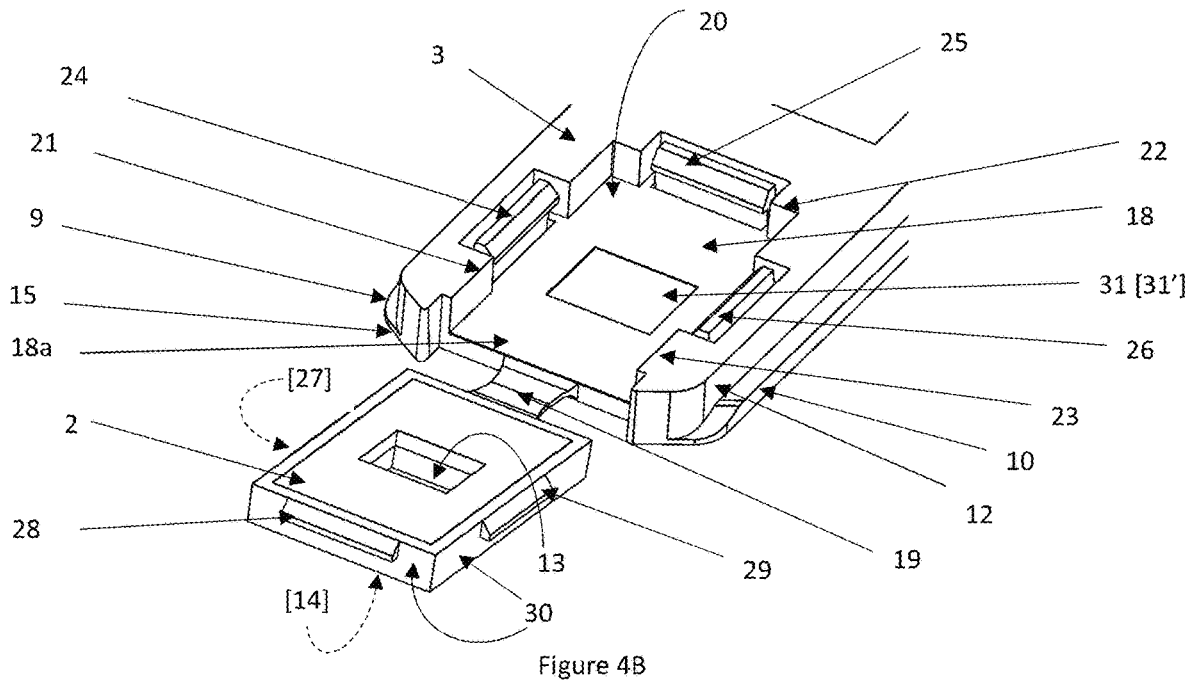
Figure 4C:
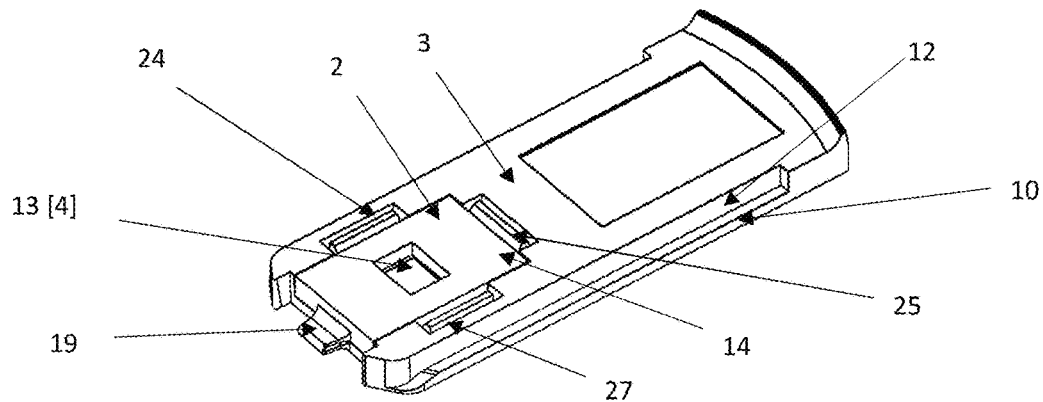

A further exemplary embodiment of the apparatus of this disclosure is illustrated at FIGS. 4A, 4B and 4C. These show practical embodiments of the sample receptacle unit (1) with a displaceable cover (2) comprising a cover aperture (13). The displaceable cover (2) is shown in two different positions: an open position at FIGS. 4A and 4B, and a closed position at FIG. 4C. The reader will appreciate that in the closed position, shown in FIG. 4C, the cover aperture (13) may serve as a well (4) for the receipt and accommodation of a sample to be analysed, as discussed in relation to FIGS. 2E and 2F.

FIG. 4A illustrates an overview of the two main parts of the sample receptacle unit (1): a main body (3) configured to cooperate with the displaceable cover (2).

FIG. 4B is an enlargement of the device in FIG. 4A providing greater detail thereof. The main body (3) comprises a bay (18) configured, by its shape and dimensions, to receive the displaceable cover (2). FIG. 4B, illustrating the cover (2) in an open position, shows the cover (2) is joined to a main body (3) of the sample receptacle unit (1) by means of a reduced thickness section (19) which, due its thinness, is flexible and effectively forms a pivot or hinge about which the cover (2) may be rotated. With the exception of the sealing arrangement (described in detail below), the entirety of the sample receptacle unit (1) may be made of the same material. The entire sample receptacle unit (1), including the sealing arrangement, may be manufactured by a single injection moulding process using the overmoulding technique, so that it forms one integral component, described in more detail in a later section herein. The composition of the sample receptacle unit (1) may be polypropylene, acetylene butanol styrene (ABS) or any suitable relatively hard plastic or polymer.

The displaceable cover (2) and the main body (3) may, as an alternative embodiment, and discussed in relation to FIG. 6 below, be formed as two distinct and non-integral components, without any reduced thickness section (19) joining them. Instead of an open end the bay end (18a) is closed. Apart from this and the absence of the section (19), all other aspects of the two main components (2, 3) and their interrelationship, as described in the next section, are the same in both variants (hinged and non-hinged).

The displaceable cover (2) may be open, as shown in FIGS. 4A, 4B, or be closed (as in FIG. 4C), and both the bay (16) and cooperating displaceable cover (2) may be of any suitable shape, such that they are configured to cooperate, in the manner described herewith.

The cover (2) and the bay (18) in combination comprise a closure means, which may be any suitable closure means, including clips, latches, screws, buttons etc.

FIGS. 4A, 4B and 4C show an exemplary embodiment of the apparatus and method disclosed herein, in which the closure means is a clip arrangement: the sides (21, 22, 23) of the bay (18) each comprise a recess which accommodates an integral clip (24, 25, 26) and the outer side surfaces (30) of the cover (2) each comprise a corresponding flange (27, 28, 29) configured to engage with the corresponding clip (24, 25, 26), when the displaceable cover (2) is displaced into the closed position, as shown generally at FIG. 4C. Further details of the closure means comprising the clip arrangement (24, 25, 26) and flanges (27, 28, 29) are provided in a later section herein.

FIG. 4B also shows that the floor (20) of the bay (18) comprises a spectroscopy element (31), which covers a floor aperture (32) (not visible in this figure), in the floor (20) of the bay (18), the spectroscopy element (31) and the floor aperture (32) in FIGS. 4A to 5C corresponding to the spectroscopy element (31') and floor aperture (32') as described in relation to FIGS. 2A to 2F. The corresponding feature in earlier drawings is given in square brackets in FIGS. 4A to 5C. The floor aperture (32) is described below in detail in relation to FIGS. 5A 5B and 5C.

Figure 5A:
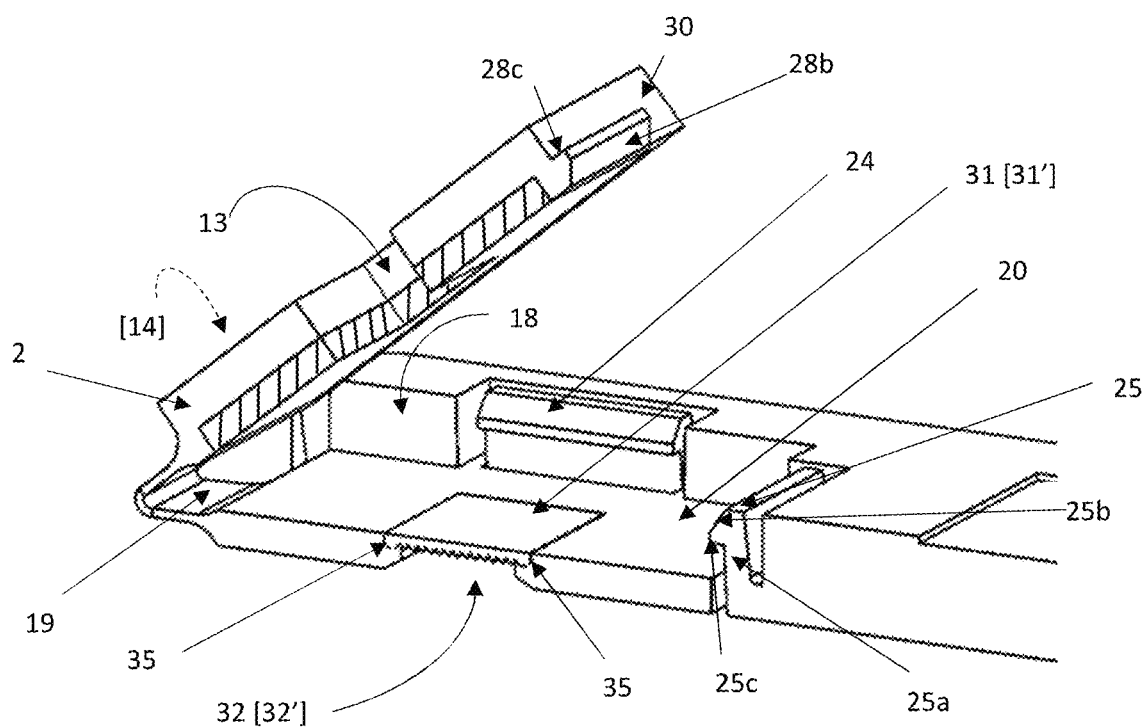
FIGS. 5A, 5B and 5C are cross-sections of a sample receptacle unit in accordance with aspects of the invention.
Figure 5B:
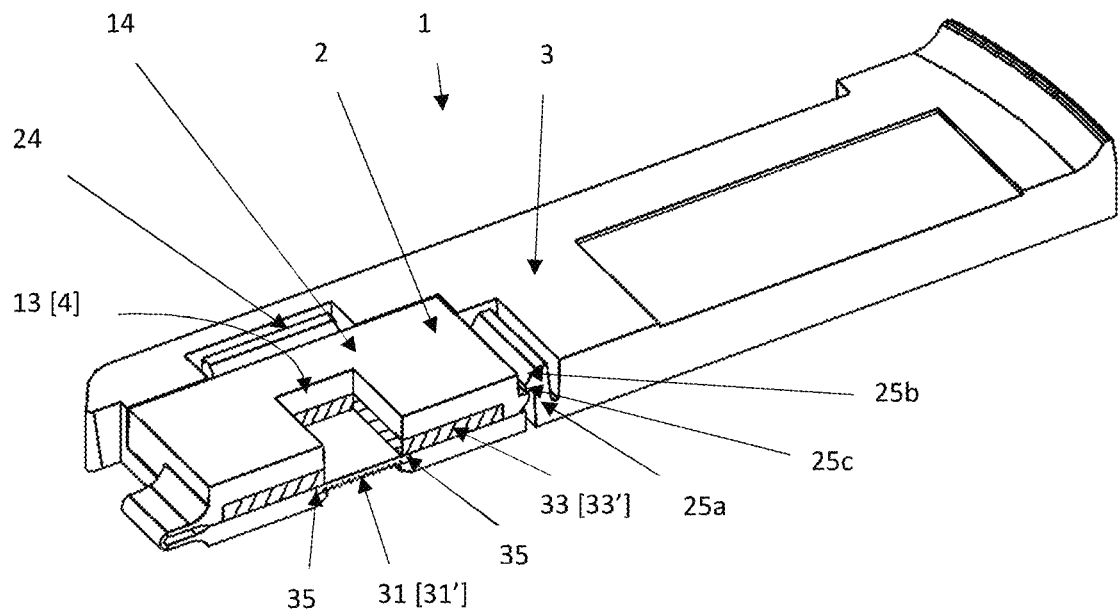
Figure 5C:
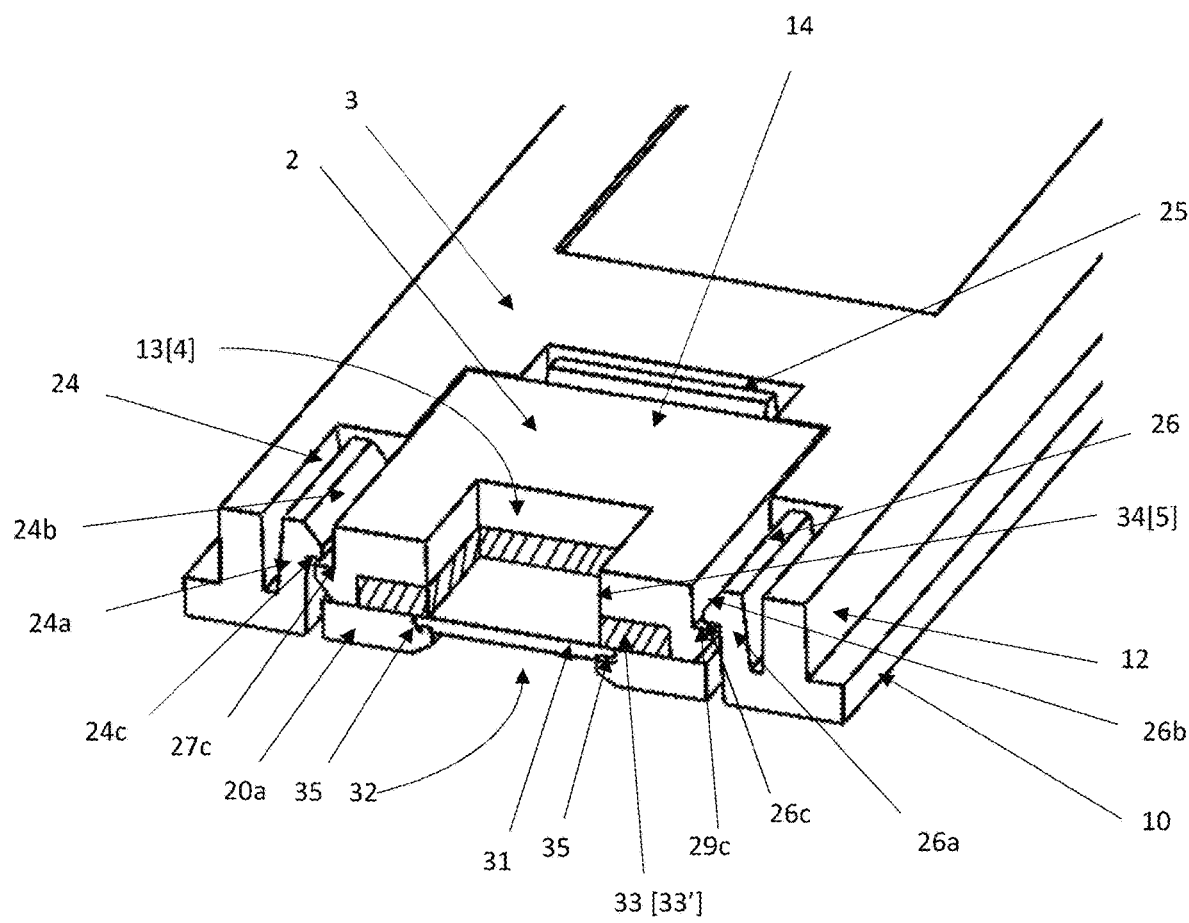

FIGS. 5A, 5B and 5C show cross-sectional views of an exemplary embodiment of the apparatus in FIGS. 4A, 4B and 4C. FIGS. 5A and 5B provide longitudinal sections of the sample receptacle unit (1), including the reduced thickness section (19). FIG. 5C shows a lateral section of the sample receptacle unit (1). In FIGS. 5A, 5B and 5C the displaceable cover (2) is shown in two different positions: an open position, at FIG. 5A, and a closed position, at FIGS. 5B and 5C.

FIGS. 5A, 5B and 5C provide more detail of a closure arrangement, according to an embodiment of the apparatus and method of the disclosure, comprising the integral clips (24, 25, 26), as well as detail of the spectroscopy element (31) and the floor aperture (32). The clips (24, 25, 26) each comprise a raised abutment (24a, 25a, 26a) which, at its proximal end, is integrally joined to the floor of the bay (18), but is otherwise free to move with respect to the bay (18). In particular, each raised abutment (24a, 25a, 26a) is configured to pivot about its fixed proximal end, such that the distal end of the abutment (24a, 25a, 26a) may be displaced toward or away from the centre of the bay (18). At its distal end each abutment comprises an inclined planar surface (24b, 25b, 26b) and radially inward extending lips (24c, 25c, 26c).

FIGS. 5A, 5B and 5C also disclose cover (2) which comprises flanges (27, 28, 29) each with an inclined planar surface (27b, 28b, 29b) and outwardly extending lip (27c, 28c, 29c). The respective inclined planar surfaces of the cover (2) and the bay (18) are configured to engage with each other, when the displaceable cover (2) is displaced toward a closed position i.e., surfaces (24b, 25b, 26b) may engage with surfaces (27b, 28b, 29b). In the closed position radially inward extending lips (24c, 25c, 26c) of the main body (3) engage with outwardly extending lip (27c, 28c, 29c) of the cover (14).

This is seen in FIG. 5A which shows the cover (2) in an open position The reader will understand that, as the cover (2) is closed further and reaches the closed position (as in FIG. 5B), the inclined surface (28b) of flange (28) on the outer side surfaces (30) of the cover (2) will impinge on the corresponding inclined surface (25b) on the abutment (25) of the bay (18). Both of these surfaces (28b, 25b) are inclined surfaces: as further force is applied to the cover to complete the closure, the inclined surface (28b) of the cover (14) will force the inclined surface (25b), which is pivotable around the proximal end of the abutment (25), radially outwards, i.e., in a direction away from the centre of the bay (18). The outward displacement of the abutment (25) will continue until the inclined surface (25b) is pushed beyond the longitudinal edge of the inclined surface (28b), the lip (28c) slides radially inward over the lip (25c) and the abutment (25) "clicks" back into its default orientation, thereby securing the flange (28) of the cover (14) in place in the bay (18), as at FIGS. 5B and 5C, the same process occurring at the abutment-flange pairs (24,27: 26,29). This click permits the person closing to receive a tactile response when the cover (2) achieves a closed position within the bay (18) of main body (18). The same closure and or locking process occurs at the other clips (24, 26) which cooperate respectively with flanges (27, 29) on the other sides of the cover (2) and bay (18).

The abutments of the bay (18) of the main body (3) and the abutments of the displaceable cover (2) are integral parts of the sample receptacle unit (1) of the moulded unit and made of the same resilient flexible material, as described previously. The reader will understand that the inclination of the inclined surfaces (24b, 25b, 26b, 27b, 28b, 29b), the composition of the material and the dimensions of the abutments (24a, 25a, 26a) are all configured to provide a suitable resistance on closure of the receptacle unit (1), to ensure locking of the cover (2) with suitable manual pressure from a user closing the cover.

FIGS. 5A, 5B and 5C illustrate an embodiment of the invention suitable for spectral analysis of a sample by reflectance or transmission spectroscopy, in which a sample to be tested forms an interface with spectroscopy element, i.e., a predetermined reflectance/ATR element or a predetermined transmission window, in accordance with reflectance and transmission spectroscopy techniques, as explained briefly above.

The embodiments illustrated in FIGS. 5A, 5B and 5C are configured to receive and contain a sample directly on the element. In the closed position, the floor aperture (32), the spectroscopy element (31) and the cover aperture (13) are aligned and radiation may pass from the floor aperture (32) through the spectroscopy element (31) to the cover aperture (13). (For reflectance/ATR configurations, transmission of radiation through the element (31) into the cover aperture (13) will be limited to an evanescent wave, as described previously.) The inner side walls (34) of the cover aperture (13) and the spectroscopy element (31) effectively form a well, as well (4) in FIGS. 2A to 2F, for receiving a sample or specimen. A sample or specimen, if loaded in the well (13,4), will sit directly on the spectroscopy element (31) and, once loaded in the well (13,4), will be also aligned within the path of the radiation.

As will be clear in FIG. 5C, when loaded in a receiving unit (102) of the spectrometer, as shown, for example, in FIG. 3B, electromagnetic radiation may enter from below the sample receptacle unit (1): the aperture (104) of the receiving unit (101), the floor aperture (32), the spectroscopy element (31) and the cover aperture (13) are then in alignment. As stated above, the sample receptacle unit (1) is so dimensioned, that when the sample receptacle unit (1) is mated in the receiving unit (101), the well (13, 4) is aligned in the radiation path of the spectrometer. The sample, if loaded on the spectroscopy element (31), will be exactly positioned at the relevant location in the light path of the spectrometer to perform the spectral analysis. The radiation from the spectrometer passes through aperture (104) of the receiving unit (101), then through the floor aperture (32) of the sample receptacle unit (1) and, at a predetermined angle, enters into the reflectance element or transmission window (spectroscopy element (31)). In ATE systems internal reflection occurs at the opposite surface of the ATE element (spectroscopy element (31)) which forms the sample/element interface: the beam or beams reflected internally in the element at the sample/element interface exit the element and may be analysed by the spectral analysis device of the spectrometer. In transmission systems the beam passes through the transmission window (spectroscopy element (31)) and is modified by the sample interfacing with the transmission window, and spectrum of the modified beam may be analysed by a suitable analysis device of the spectrometer.

The sample may generally be loaded on to the spectroscopy element (31) when the displaceable cover (2) is in the closed position, FIGS. 5B and 5C, but may also be loaded in the open position, FIG. 5A.

Returning now to FIGS. 5A, 5B and 5C, the structure of sample receptacle unit (1) is now described. For use in spectral analysis, the closed position of the displaceable cover (2), as shown in FIGS. 5B and 5C, may be adopted. The cover (2) comprises a cover aperture (13). The inner side walls (34) of the cover aperture (13) extend to the spectroscopy element (31). Together the inner side walls (34) of the cover aperture (13) and the spectroscopy element (31) form a well (13), equivalent to well (4) in the description above, configured to contain a sample or specimen (which is not shown in the figures). The spectroscopy element (31) covers the floor aperture (32) in the floor (20) of the bay (18). A shallow recess (35) in the floor (20) surrounds the opening of the floor aperture (32) in the bay floor (20) and is dimensioned to accommodate the spectroscopy element (31) and prevent lateral movement thereof. The element (31) located in the shallow recess (35) covers the floor aperture (32) as shown in FIGS. 5B and 5C. A sample or specimen to be analysed may be placed directly on the spectroscopy element (31) thereby forming an interface with the element (31).

The inner side walls (34) of the cover aperture (13) in the displaceable cover (2) comprise a sealing arrangement which is now described. At least a lower portion (33), shown with hatched lines, of the inner side walls (34) of the cover aperture (13) is composed of a sealing material. This may be rubber, or rubber-like material, such as a thermoplastic elastomer, for example thermoplastic polyurethane (TPU). This sealing material (33) is bonded on to the main material of the sample receptacle unit (1) and forms an integral part of the cover (14) of the sample receptacle unit (1), the whole sample receptacle unit (1), as explained below, being formed in a single injection-moulding manufacturing process. The sealing material at the lower portion (33) of the side walls (34) is softer than the material forming the rest of the sample receptacle unit (1) and, in the closed position, interfaces with peripheral portions of the upper face of the spectroscopy element (31). Being relatively soft, the sealing material (33) yields slightly at the interface with the spectroscopy element (31), thereby exerting a pressure on the spectroscopy element (31). The mechanical properties and dimensions of the sealing material (33) are configured to provide a pressure on spectroscopy element (31) which avoids any damage to the spectroscopy element (31) but is sufficient to form a reliable seal at the interface between the side walls (19) and the element (31). In this exemplary embodiment, when the cover (2) is in the closed position, the bottom surface of the well (13,4) is formed entirely by the spectroscopy element (31). The spectroscopy element (31) is effectively "sandwiched" between the base floor (20) and the sealing material (33), which serves to retain the element (31) in place and to provide a leakproof seal around the bottom of the well (13) for proper containment of the sample therein.

A closure means, as referenced previously, such as the clip arrangement, described in detail in an earlier section herein, is configured to hold the displaceable cover (2), once positioned in the bay (18), in the closed position. The closure means, in combination with the sealing material (33), is configured to deliver a downward retaining force on the cover (2) in the closed position, thereby providing the required pressure, via the sealing material (33), at the interface with the peripheral portions of the spectroscopy element (31), as described above.

The seal provided by the sealing material (33) at its interface with the spectroscopy element (31) not only serves to hold the spectroscopy element (31) in place in the shallow recess (35), and spanning the floor aperture (32), but also facilitates reliable leakproof seal around a sample (not shown), possibly in liquid form, when positioned in the well (4) formed by cover aperture (13) and the spectroscopy element (31). The sample, especially a liquid sample, sitting on the spectroscopy element (31) in the well (13,4) is sealed by the sealing material (33) in contact with the spectroscopy element (31). The seal formed at the interface of sealing material (33) with the spectroscopy element (31) surrounds the sample. An advantage of this arrangement is that, using a single simple cheap manufacturing process, a sample receptacle unit (1) may be provided, which holds the spectroscopy element (31) in place and provides a good seal around the periphery of face of the spectroscopy element (31) for retention on the spectroscopy element (31) of a sample. This unit (1) is easy to load with a sample and convenient to enter into the receiving unit (101).

In an alternative embodiment (not illustrated), in which the well dimensions are larger than the element dimensions, the lower portion (33) extends to the floor (20) rather than to the spectroscopy element (31).

In sample receptacle units (1) for reflectance and ATR systems the spectroscopy element (31) is an ATR element and may be formed of a suitable crystal material, such as silicon or germanium. Although germanium is less fragile than silicon and is widely used as an ATR element, the sample receptacle units in accordance with embodiments of the apparatus disclosed herein provide enhanced protection of the element and may comprise spectroscopy elements of silicon which is relatively cheap and easy to integrate into disposable units. The sealing arrangement as described above provides the added benefit of cushioning the crystal and minimising damage thereto.

In sample receptacle units (1) for transmission spectrometers, the spectroscopy element (31) is a transmission window, made of suitable material, such as Zinc Selenide, transparent to the incoming radiation, selected to achieve least interaction with the radiation. In practice, any effect by the window on the spectrum in the output beam is known or measurable and the spectral analysis compensates for window effects.

Figure 6:
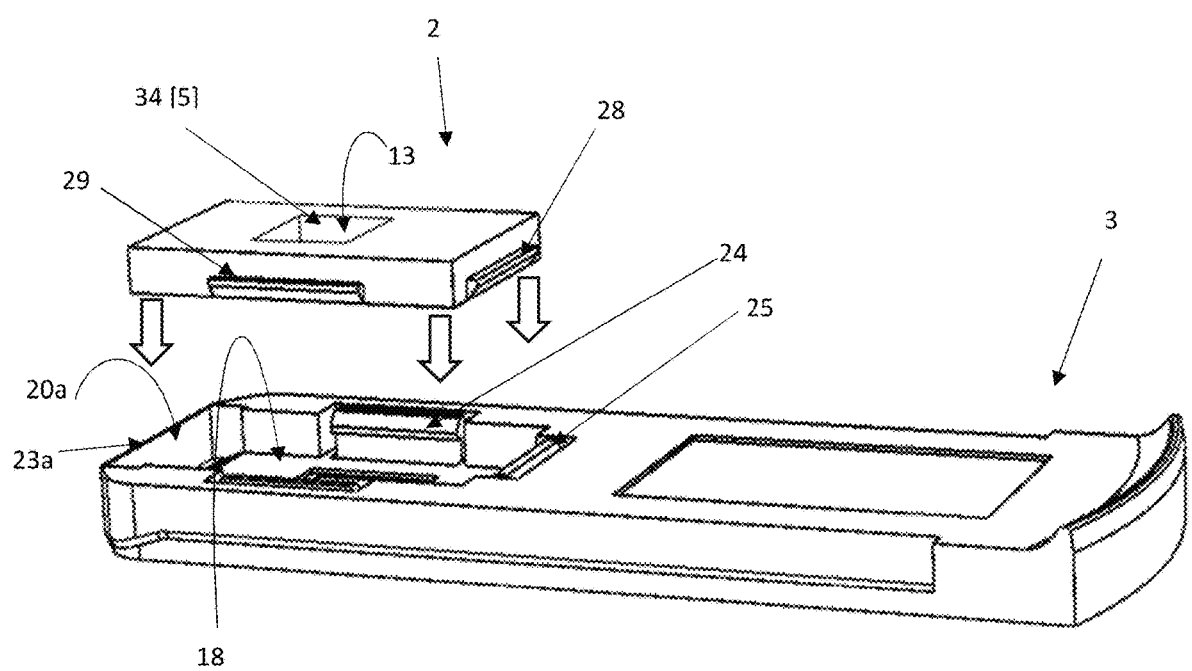
FIG. 6 is an illustration of a sample receptacle unit in accordance with an aspect of the invention.

FIG. 6 shows a further embodiment of the apparatus in accordance with the disclosure herein. In this embodiment the displaceable cover (2) is not integral with the main body (3) of the sample receptacle unit (1) and the end (20a) of the bay (18) in the main body (3) is a closed end and is structured accordingly with four sides (21, 22, 23, 23a). The bay (18) is configured to receive the displaceable cover (14) but there is no reduced thickness section (19) to serve as a hinge. This configuration nevertheless comprises closure means, with clips (24, 25, 26) and corresponding flanges (27, 28, 29) as in embodiments already described herein. In this embodiment, an additional clip-flange arrangement (not illustrated), as previously described for other embodiments, is envisaged on the fourth side of the cover (14) and at the closed end (20a) of the bay (18). The displaceable cover (2) may be inserted into the four-sided bay (18) and is configured to cooperate therewith. The structure of the cover aperture (13) comprising inner side walls (34) with a lower portion (33) made of a softer sealing material, rubber or rubber-like in composition (not visible in FIG. 6), is otherwise the same as other embodiments disclosed herein, a seal being formed at the interface of the sealing material (33) and the spectroscopy element (31). The cover (2), including the portions (33), is constructed by a single injection moulding with over-moulding procedure, as in other embodiments.

Figure 7A:
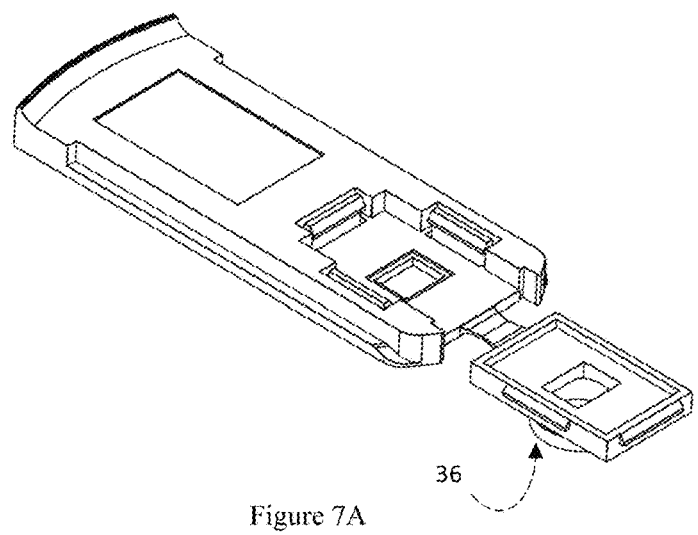
FIGS. 7A, 7B and 7C are illustrations of a sample receptacle unit in accordance with aspects of the invention.
Figure 7B:
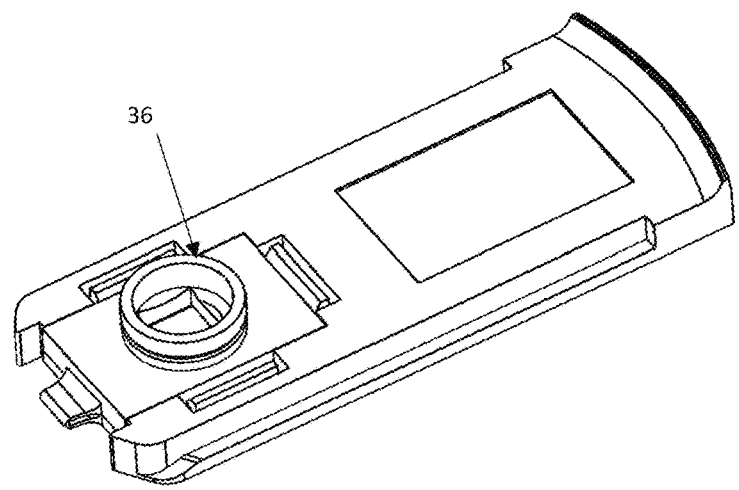
Figure 7C:
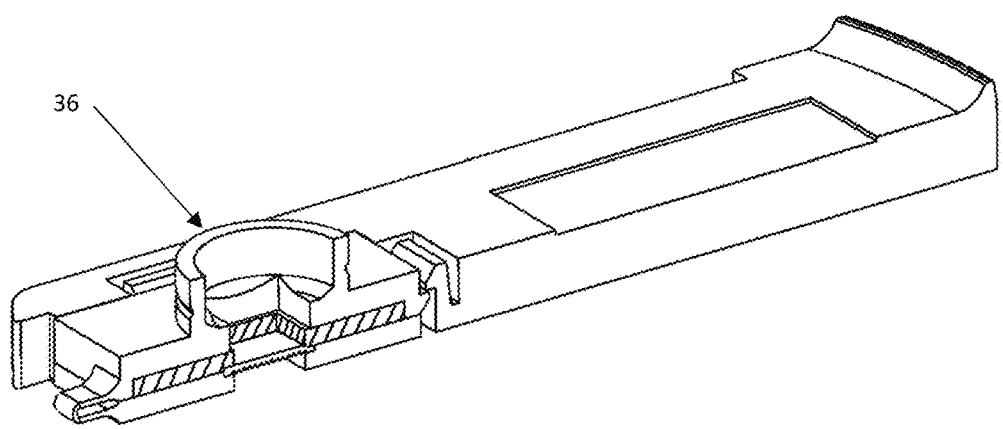

FIGS. 7A and 7B show an embodiment of the apparatus in accordance with this disclosure in which the walls (34) of the cover aperture (13) extend out of the well (13) and above the upper surface of the cover (14), to form an extended well (36), providing greater protection to any loaded sample in the well (13). FIG. 7C shows the embodiment in cross-section. These figures show the well in a circular form, but this embodiment, as in all embodiments disclosed herein, may comprise wells of any geometry and shape, not limited to circular, rectangular or square formats. A seal at the interface of the sealing material (33) and the spectroscopy element (31) is provided as described in respect of other embodiments. A reduced thickness section, serving as a hinge (as shown), may or may not be present in the arrangement, as already discussed herein in respect of various aspects.

Figure 8A:
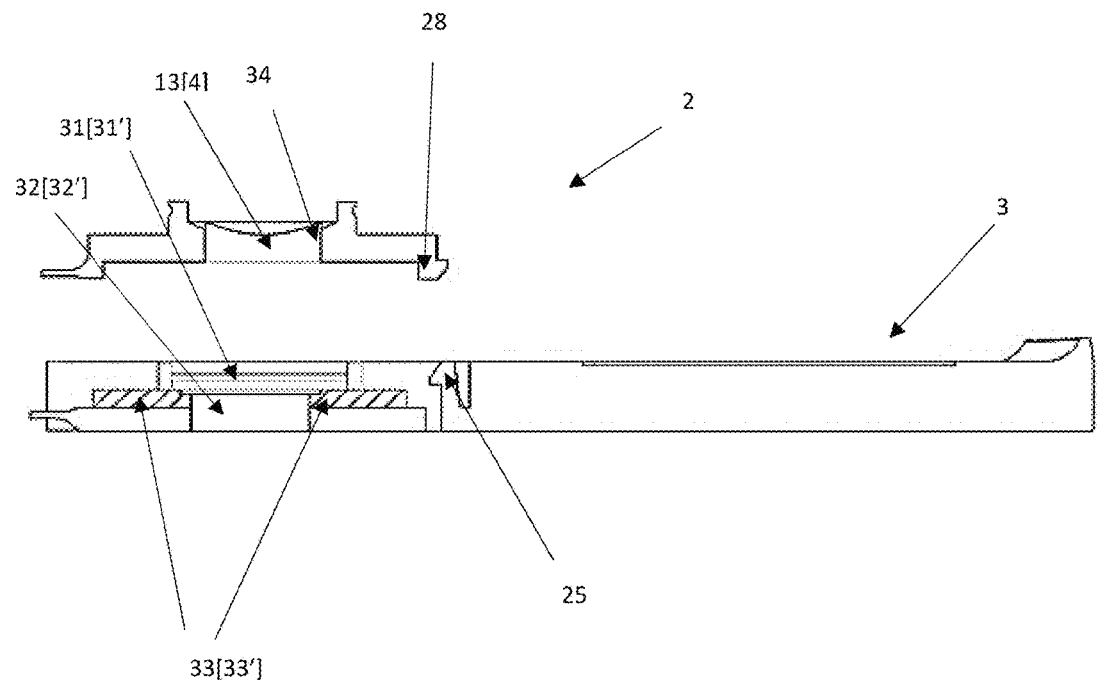
FIGS. 8A and 8B show cross-sectional views of a sample receptacle unit in accordance with aspects of the invention

FIG. 8A illustrates a further aspect of the apparatus in accordance with this disclosure. In this aspect, shown in cross-section, the displaceable cover (2) and the main body (3) of the sample receptacle unit (1) are not joined by a hinge such as reduced thickness section (19). As in the embodiment of FIG. 6, the cover (2) and the main body (3), are separate but mechanically fitting, components. The displaceable cover (2) may be displaced into a closed position in which it is inserted in the bay or recess of main body (3), and may be held closed by closure means, such as a clip arrangement, comprising at least one clip-flange pair (25,28) as described herein in relation to other embodiments. The closure means provides a retaining force on the cover (2) forcing it into engagement with the spectroscopy element (31) which is in turn forced into engagement with the sealing material (33) comprised in the floor of the bay of the main body (3), in the manner already described in relation to FIG. 2F (corresponding reference signs are provided in square brackets in FIG. 8). The seal formed at the interface of the sealing material (33) and the spectroscopy element (31) functions in manner analogous to that already described in respect of other embodiments. As with other embodiments, as previously described, the main body (3) and the cover (2) may be joined by a reduced thickness portion (19), such that the main body (3) and cover (2) form together a single integral component (not shown in the figure).

Figure 8B:
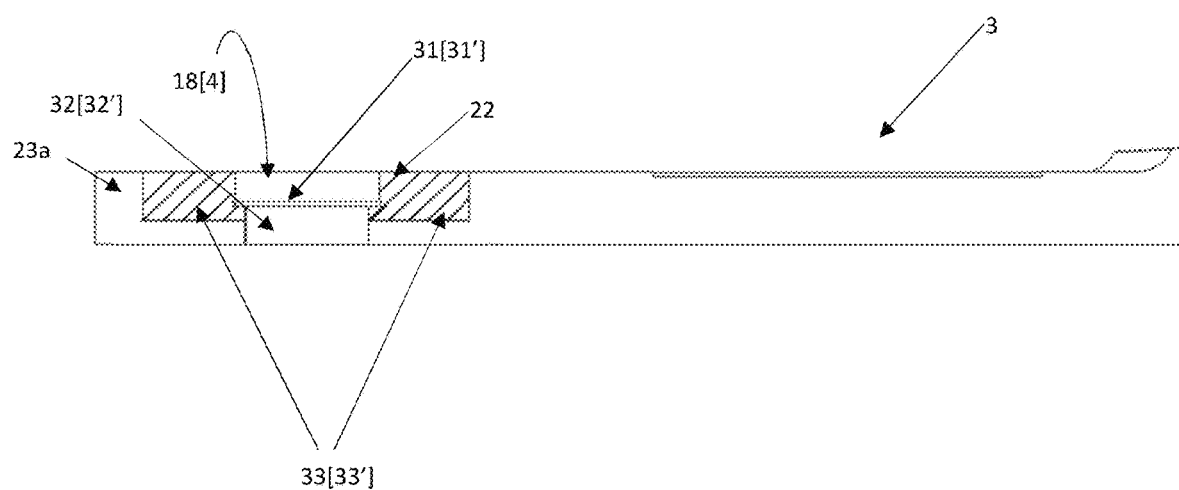

In a further aspect according to the apparatus herein disclosed and illustrated in cross-section at FIG. 8B, the sample receptacle unit (1) comprises a main body (3) with bay (18) configured without a displaceable cover (2) at all. In this embodiment the sealing material (33) is fabricated onto at the lower portions of the sides of the bay (18) which is closed at end (20a) by fourth side (23a). The dimensions of the bay (18) are slightly less than those of the spectroscopy element (31) located on the floor of the bay (18), such that the sealing material (33) in the lower portion of the bay sides (21, 22, 23, 23a) interface directly with the spectroscopy element (31), forming a seal between the sides (21, 22, 23, 23a), (not all visible in the figure) and the element (31). The spectroscopy element (31) is retained in place by the sealing material (33) in the bay sides. The dimensions of the floor aperture (32) are smaller than the element (31) which spans the floor aperture (32), the bay (18) serving as a well (4), as described in relation to other embodiments. The bay is configured to receive the sample placed directly on the element (31).

As stated previously, the exemplary embodiments of the sample receptacle unit (1) disclosed above may be used in reflectance and transmission spectral analysis and are configured for use in corresponding spectrometers: spectroscopy element (31',31) may be a reflectance/ATR element or a transmission window, and made of the appropriate material, as specified herein above.

Figure 9A:
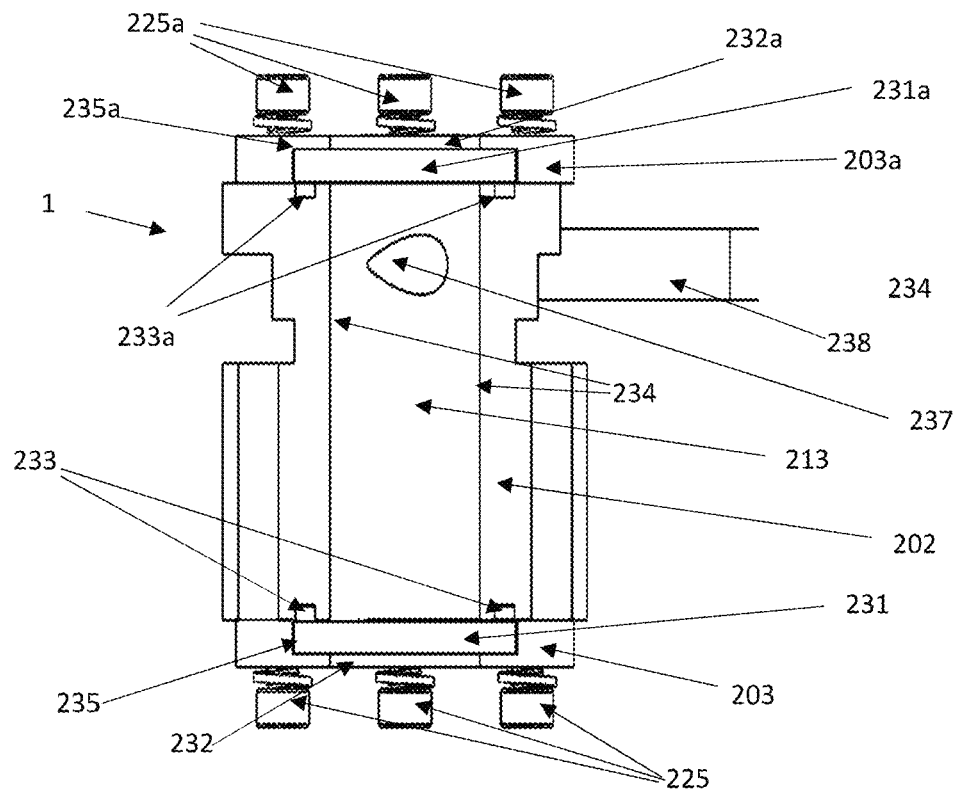
FIG. 9A is a cross-section of a sample receptacle unit in accordance with an embodiment of the invention for use in transmission spectral analysis.
Figure 9B:
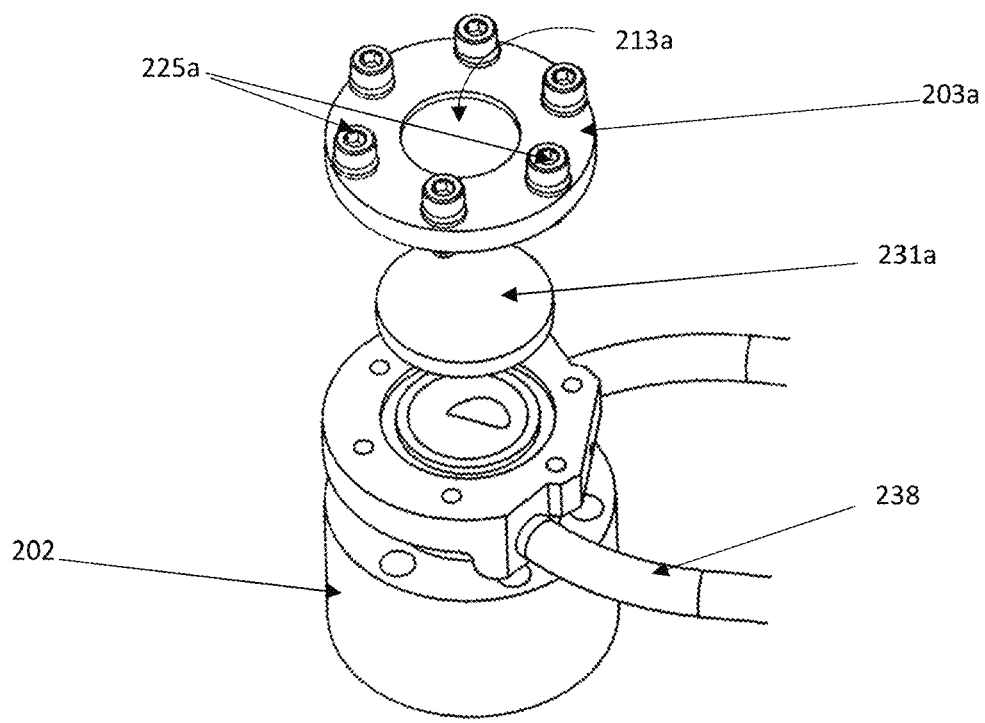
FIG. 9B is an illustration of a sample receptacle unit in accordance with an embodiment of the invention for use in transmission spectral analysis.

FIGS. 9A and 9B illustrate a further exemplary embodiment of a sample receptacle unit (1) for use specifically with transmission spectrometers. In this embodiment the spectroscopy element is a transmission window (231, 231a): the sample receptacle unit (1) comprising a first transmission window (231) and second transmission window (231a), mounted on a frame (202). The inner walls (234) of the frame (202), together with the two transmission windows (231, 231a), effectively form a cell for containment of a sample in the space (213) thereby formed. A transmission cell is a containment vessel, which has windows on opposite ends through which a beam of radiation from a spectrometer can be passed, the cell windows themselves having little effect on the spectrum of the radiation (or a known effect for which compensation may be made).

Such a cell may be used in transmission spectroscopy, the rudiments of which were outlined in relation to FIG. 1B: the first window (231) passes the input radiation, which then passes through a material (the sample to be analysed) contained in the cell and exits the cell via the second window (231a). As described in relation to other previous embodiments, a sample receptacle unit (1) according to the embodiment shown in FIGS. 9A and 9B may be mated with a receiving unit of a spectrometer, ensuring alignment of the windows and the sample in the radiation path of the transmission spectrometer. The mating may be by a slide arrangement or any other mating arrangement, as previously described herein in respect of other embodiments.

As in embodiments previously described, sample receptacle units (1) comprising a transmission cell as in FIGS. 9A and 9B may be fabricated by means of single injection moulding procedure comprising over-moulding, with at least one of the transmission windows (231, 231a) being sealed into frame (202) of the unit (1) using sealing material (233, 233a). The windows are retained in place by the sealing material (233, 233a) already described, which is comprised in the inner walls (234) of the frame (202) at both the interface of the inner walls (234) with the first window (231) and with the second window (231a), such that the two windows (231, 231a) are sealed in place, in the manner previously described. At least one of the windows (231, 231a) may be mounted in covers (218, 218a), which may be fixed on the frame (202) or may be displaceable with respect the frame, being displaceable by insertion, rotation, removal etc, to allow sample material to be introduced into the cell, the respective body (203, 203a) being configured to be closed and sealed against sealing material (233, 233a). The transmission windows (231, 231a) are dimensioned to fit into a receiving recess (235, 235a) formed around a cover aperture (232, 232a) in the respective body (203, 203a).

As in previous embodiments, the walls (234) may be pivotable on the body (203, 203a) by hinge means (not shown) and may be formed as a single-component comprising the frame and walls (202, 234), the frame and walls (202, 234) connected by a reduced thickness section (219) (not shown), analogous to the reduced thickness sections described in relation to other embodiments. The body (201, 201a) may, alternatively, be formed as a separate entity, distinct from the frame (202,234). The closure means (225, 225a) for the bodies (203, 203a) may be a screw, clamp or clips (not all illustrated) to produce the force required to create the seal, in the manner already described. In a manner analogous to that already described, when the bodies (203, 203a) is in a closed position, the closure means (225, 225a) exerts a pressure on the window (231, 231a) which sits on the sealing material (233,233a) and providing a seal therewith, corresponding to the seal provided in other embodiments herewith. The seal is sufficient to retain the sample in the cell. The cell may comprise a sample window (237) providing an alternative means for introducing sample material into the cell.

One advantage of a transmission cell, as discussed above, is that the sample is completely contained within the cell, eliminating the risk of spillage and making transmission suitable for the analysis of liquids and volatile samples. Alignment in spectrometers of different orientations, including horizontal beams, are facilitated by the transmission cell. The cell may be connected via a hose (238) to a pump to facilitate analysis of a sample in a vacuum or overpressure, or under continuous flow conditions.

The following section relates to the manufacturing process of an apparatus according to this disclosure: as already referenced, the sample receptacle unit (1) with displaceable cover (2, 202,), may be manufactured as single-piece component, as shown, for example, in FIG. 4A, 5A, 7A and 8A. As described herein, this may be fabricated using a single injection moulding procedure, which may comprise one or more overmoulding steps to combine two or more different plastic materials. The steps performed in such a procedure are now described in detail.

First a base layer is produced using a first material, which may be relatively hard plastic-type material, either by injection moulding or another fabrication technique. This base layer is then moulded over with a second material, different from the first material and having different physical properties, such as a rubber or rubber-like material. The end product from such a procedure is a single integral component comprising selected portions having different properties and functions. For example, the first material may provide the main structure and mechanical strength of the component, while the relatively soft portions, of the second material, may make it suitable for creating ergonomics or seals. Such a process can reduce part count and production time as two functions can be achieved with a single component. Manufacturing complexity and costs are commensurately reduced.

There are two main methods used to create overmoulded parts: insert moulding and two-shot/multi-shot/co-moulding. Both methods may be envisaged for the fabrication of embodiments of the apparatus disclosed herein. Insert moulding takes an already fabricated part and places this within an overmoulding tool, the part is then overmoulded in an injection moulding machine creating a multi-material component. Insert moulding can be used to mould; plastic-over-metal, rubber-over-metal, plastic-over-plastic or rubber-over-plastic. In both over-plastic techniques, typically two separate injection moulding processes are used to create the finished part. The base layer is produced in the first injection moulding process, this part is then allowed to cool before it is placed in a second tool and a second injection moulding process will finish the part. Insert moulding has a generally lower start-up cost as the tooling is more simple but due to the need for manual labour to place the part within the mould the part costs are higher. Two-shot moulding requires more upfront investment as the tools are complex but as they automate the parts production part costs are lower.

Two-shot/multi-shot/co-moulding, by contrast, uses a single process to create the overmoulded part. The injection moulding tool require for this method is more complicated as it requires many more moving parts allowing a multi-material part to be produced. For a two material overmoulded part the tool will start by injection moulding the base layer, it will then open. Once the tool is open the part will be aligned automatically to a separate cavity where the second material will be moulded over the first completing the part.

With respect to the apparatus disclosed herein, the reader will appreciate that the sample receptacle unit (1) can be moulded as a single integral unit, corresponding to the base layer, as in the method steps of the inject-moulding process described above: the main body (3, 203), the reduced thickness section (19) and the displaceable cover (2,202) can be provided as a single component formed of the base layer, as shown, for example at FIGS. 4A and 4B, or, alternatively the main body (3) and the displaceable cover (2,202) may be produced as two separate components configured to communicate as previously described. The second material, formed on the base layer by means of the overmoulding process described above, comprises the sealing material (33',33,233), described previously, is relatively flexible, in relation to the base material, and serves to provide the sealing functions, previously described herein. The overmoulding process bonds or fuses the sealing material (33', 33,233) in or to the lower portion of the inner side walls (5,21,22,23,23a,34,34,234) of the aperture cavity (13, 213), as in embodiments described herein. Alternatively, in embodiments with no cover (2,202), the overmoulding of the sealing material is to lower portions of the bay side walls (21, 22, 23).

As the reader will appreciate, in accordance with embodiments of the apparatus disclosed herein, the sample may be loaded into the sample receptacle unit (1) outside the spectrometer. The arrangements described herein are not only far more convenient for the operator, especially in contrast to conventional containment vessel arrangements, but it ensures the spectrometer is not contaminated by stray quantities of the sample. The arrangement described herein is particularly suitable for toxic or corrosive samples. The easy fit arrangement, described earlier, ensures that the loaded sample receptacle unit (1) when entered in the receiving unit (102) correctly aligns the loaded sample in the correct position for correct spectral analysis. The risk of misalignment due to human error is eliminated.

The reader will further appreciate that this low-cost sample receptacle unit, a product of the simple cheap low divergence process described above, may be produced and consumed in large quantities: it may effectively serve as a disposal single-use item. This allows operators or analysis personnel to load large quantities of sample receptacle units for rapid turnover in the spectrometer. Mobility is further facilitated by the dimensions of the sample receptacle unit which is a few cm in length and width, for example approximately 4*cm by* 2 cm, and a convenient size for hand-held use. Small dimensions reduce the cost of manufacture, allows storage in large quantities and permits disposability.

Conventional spectrometer systems may comprise an element of crystal, possibly diamond or germanium, which may form a fixed part of the spectrometer apparatus, being fragile and susceptible to damage and contamination, and therefore requiring protection and repeated cleaning. Such materials are expensive. It will be further understood that in accordance with embodiments of the arrangement disclosed herein the sample receptacle unit may be formed to comprise an element which may therefore also be disposable thereby reducing the requirement to protect the element from damage. The need to repeatedly clean the element is effectively eliminated in a disposable sample receptacle unit, the operator instead using the next available disposable unit. In embodiments using silicon crystal elements rather than germanium, such advantages are reinforced. Conversely, because of its low-cost reproducibility, the arrangement disclosed herein may also facilitate a stacking or library approach to samples of different materials or pluralities of the same sample, wherein the samples may be tested or re-tested over time, including over extended periods, which would be prohibitively expensive in high cost conventional arrangements.

Whereas this disclosure makes reference to several examples of the aspects and embodiments, it will be understood that embodiments are not restricted to those which explicitly referenced herein: all aspects and embodiments may be modified by any amendments, alterations, variations or substitutions, including those not specifically referenced herein. Where some features of various examples or embodiments appear in some examples, embodiments or drawings and not in others, this is only for brevity and intelligibility. Accordingly, any component or feature of any example, embodiment or figure may, in combination with any component or feature of any other example, embodiment or figure, be referenced. Components, features and structures of the aspects and embodiments disclosed herein may be combined, as appropriate and this disclosure should be construed as encompassing all combinations and permutations of features referenced herein. Accordingly, the embodiments of the invention are not to be understood as limited by the above written description but are limited only by the scope of the accompanying Claims.

The invention claimed is:

1. A system for containing a liquid sample for analysis by a spectrometer, comprising a removable injection moulded sample receptacle unit comprising:
   a cover comprising a cover aperture with inner walls, a portion of which is bonded with a sealing material, forming a single integral component with the inner walls, and
   a main body with a bay comprising a bay floor with a floor aperture in the bay floor and a first spectroscopy element spanning the floor aperture, the first spectroscopy element being one of a reflectance element for reflectance spectral analysis or a transmission window for transmission spectral analysis
   wherein the cover is displaceable between an open position and a closed position, and the bay of the main body is configured to receive, in the closed position, the displaceable cover, the cover aperture inner walls and the first spectroscopy element being configured to constitute, in the closed position, a well for containment of the sample;
   wherein in the closed position, a closure means is configured to retain the displaceable cover in the closed position on the floor of the main body and to force the sealing material into sealing contact with the first spectroscopy element.

2. The system as in claim 1 wherein, the well, the floor aperture and the first spectroscopy element are configured to align with each other and the floor aperture is configured to pass radiation from a radiation source to the first spectroscopy element.

3. The system as in claim 1, wherein the sealing material is bonded to the cover aperture inner walls by overmoulding.

4. The system as in claim 1, wherein the sealing material is configured, in the closed position, to form a seal at the interface of the cover aperture inner walls with the first spectroscopy element and retain the first spectroscopy element in place.

5. The system as in claim 4, wherein the main body and the displaceable cover are joined to each other by a reduced thickness section, and wherein the displaceable cover, the main body and the reduced thickness section form a single integral component.

6. The system as in claim 5, wherein the reduced thickness section is flexible and is configured to form a hinge between the displaceable cover and the main body for pivotal movement of the displaceable cover relative to the main body.

7. The system as in claim 1, wherein the closure means comprises a clip arrangement, comprising one or more a clip-flange pair arrangements, wherein, for each clip-flange pair, either an inner side of the bay or an outer side of the displaceable cover comprise a clip, configured for engagement with a flange comprised in the other of the inner side of the bay or the outer side of the displaceable cover.

8. The system of claim 1, further comprising a receiving unit removably fixed to a spectrometer, the receiving unit comprising a recess configured to receive the sample receptacle unit, wherein the sample receptacle unit is configured to reversibly mate with the recess of the receiving unit.

9. The system as in claim 8, the receiving unit further comprising a receiving unit aperture for receiving radiation from a radiation source of the spectrometer, wherein, when the sample receptacle unit is mated with the recess, the floor aperture is aligned with the receiving unit aperture and the radiation source, and the spectroscopy element is aligned to receive the radiation from the radiation source.

10. The system as in claim 9, wherein the sample receptacle unit is configured to slide into the recess and be releasably secured in the recess.

11. The system as in claim 10, wherein one of the sample receptacle unit and the recess has elongate grooves, the other of the sample receptacle unit and the recess has elongate flanges, the elongate grooves being configured to releasably accommodate the elongate flanges.

12. The system of claim 1, wherein the first spectroscopy element is an ATR crystal element composed of one of silicon or germanium or zinc selenide or diamond.

13. The system of claim 1 wherein, the transmission window is composed of one of calcium fluoride, sapphire, zinc selenide, potassium bromide, barium fluoride, sodium chloride or fused silica.

14. The system of claim 13, wherein the cover wherein the inner walls of the cover aperture extend away from the main body, forming a frame with a space for containment of the sample.

15. The system as in claim 14 further comprising a second transmission window in a second main body, the first and second transmission windows, the first and second main bodies, and the frame together forming a transmission cell for transmission spectral analysis.

16. A method for producing the system of claim 1, the method including:
    injection moulding, in a first fabrication procedure, the displaceable cover; and
    injection moulding, in a second fabrication procedure, the main body, the displaceable cover and the main body each constituting a single integral component.

17. A method for producing the system of claim 5, the method including:
    injection moulding, in a third fabrication procedure, the displaceable cover together with the main body being fabricated together as a single integral component.

18. The method of claim 16 wherein the first fabrication procedure comprises injection moulding of the displaceable cover of a first material and the second fabrication procedure comprises injection moulding of the first material, the first material composed of polypropylene, acetylene butanol styrene (ABS) or other thermoplastic, or hard polymer; and
    further comprising over-moulding of a sealing material on to the first material, the sealing material being soft relative to the first material and a thermoplastic elastomer or a thermoplastic polyurethane (TPU).

19. The method of claim 17, wherein the third fabrication procedure comprises injection moulding of the displaceable cover together with the main body as a single integral component from a first material, the first material composed of polypropylene, acetylene butanol styrene (ABS) or other thermoplastic, or hard polymer; and
    further comprising over-moulding of a sealing material on to the first material, the sealing material being soft relative to the first material and a thermoplastic elastomer or a thermoplastic polyurethane (TPU).

20. The system of claim 1, wherein the sealing material is a rubber or rubber-like sealing material.

\* \* \* \* \*